US012701116B2

(12) United States Patent
Kent, Jr. et al.

(10) Patent No.: US 12,701,116 B2
(45) Date of Patent: *Aug. 4, 2026

(54) SYSTEM AND METHOD FOR IDENTIFYING AN APPLICATION INITIATING A COMMUNICATION IN A COMPUTING ENVIRONMENT

(71) Applicant: Arista Networks, Inc., Santa Clara, CA (US)

(72) Inventors: Troy Kent, Jr., Durham, NC (US); Gary Golomb, Los Gatos, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/897,715

(22) Filed: Sep. 26, 2024

(65) Prior Publication Data

US 2025/0023870 A1      Jan. 16, 2025

Related U.S. Application Data

(63) Continuation of application No. 16/702,855, filed on Dec. 4, 2019, now Pat. No. 12,126,618.

(60) Provisional application No. 62/775,225, filed on Dec. 4, 2018.

(51) Int. Cl.
*H04L 29/00* (2006.01)
*H04L 9/40* (2022.01)
(52) U.S. Cl.
CPC ...... *H04L 63/0876* (2013.01); *H04L 63/0428* (2013.01); *H04L 63/102* (2013.01); *H04L 63/104* (2013.01); *H04L 63/20* (2013.01)

(58) Field of Classification Search
CPC ............ H04L 63/0876; H04L 63/0428; H04L 63/102; H04L 63/104; H04L 63/20; H04L 63/166
See application file for complete search history.

(56) References Cited

U.S. PATENT DOCUMENTS

| | | | | |
|---|---|---|---|---|
| 6,332,168 | B1 * | 12/2001 | House ................. | G06F 9/44521 |
| | | | | 719/331 |
| 7,047,288 | B2 * | 5/2006 | Cooper ............... | H04L 41/0609 |
| | | | | 704/2 |
| 7,143,439 | B2 * | 11/2006 | Cooper ............... | H04L 41/0609 |
| | | | | 726/13 |
| 7,760,882 | B2 * | 7/2010 | Tidwell ................... | H04L 67/02 |
| | | | | 726/5 |
| 8,307,431 | B2 * | 11/2012 | Krishnamurthy ....... | H04L 63/10 |
| | | | | 726/22 |

(Continued)

*Primary Examiner* — Don G Zhao
(74) *Attorney, Agent, or Firm* — Fountainhead Law Group, PC

(57) ABSTRACT

System and method to identify a security entity in a computing environment is disclosed. Communication between a user computer and at least one destination computer by a security appliance is monitored by a security appliance. Selective information from the communication is extracted. A primary fingerprint is generated using a subset of the selective information. The generated primary fingerprint is evaluated for a match in an application ID database. When there is a match, corresponding application ID is assigned to the communication, wherein the application ID is associated with an application that generated the communication.

20 Claims, 22 Drawing Sheets

(56) References Cited

U.S. PATENT DOCUMENTS

| | | | | |
|---|---|---|---|---|
| 8,869,269 | B1* | 10/2014 | Ramzan | H04L 67/02 |
| | | | | 709/206 |
| 9,071,663 | B2* | 6/2015 | Oh | H04N 21/435 |
| 9,838,388 | B2* | 12/2017 | Mather | G06F 21/6218 |
| 9,854,287 | B2* | 12/2017 | Oh | H04N 21/25891 |
| 9,930,497 | B2* | 3/2018 | Bargetzi | H04W 4/023 |
| 10,075,437 | B1* | 9/2018 | Costigan | H04L 9/006 |
| 10,419,222 | B2* | 9/2019 | Mahaffey | H04L 9/3247 |
| 11,171,964 | B1* | 11/2021 | Huang | G06F 21/33 |
| 12,126,618 | B1* | 10/2024 | Kent, Jr. | H04L 63/0876 |
| 12,166,750 | B2* | 12/2024 | Yee | G06F 21/40 |
| 2003/0217011 | A1* | 11/2003 | Peinado | G06F 21/10 |
| | | | | 705/59 |
| 2006/0277275 | A1* | 12/2006 | Glaenzer | H04L 69/18 |
| | | | | 709/219 |
| 2008/0215883 | A1* | 9/2008 | Fok | H04W 12/06 |
| | | | | 713/167 |
| 2012/0179767 | A1* | 7/2012 | Clarke | H04L 51/234 |
| | | | | 709/206 |
| 2012/0231770 | A1* | 9/2012 | Clarke | H04W 4/12 |
| | | | | 455/414.1 |
| 2013/0067546 | A1* | 3/2013 | Thavasi | G06F 21/31 |
| | | | | 726/7 |
| 2013/0067547 | A1* | 3/2013 | Thavasi | G06F 21/32 |
| | | | | 726/7 |
| 2014/0020006 | A1* | 1/2014 | Yamagishi | H04N 21/6547 |
| | | | | 725/19 |
| 2014/0149455 | A1* | 5/2014 | Carr | G06F 11/3051 |
| | | | | 707/770 |
| 2014/0244851 | A1* | 8/2014 | Lee | H04L 45/54 |
| | | | | 709/228 |
| 2015/0070460 | A1* | 3/2015 | Okuyama | H04L 67/303 |
| | | | | 348/14.08 |
| 2015/0101043 | A1 | 4/2015 | Clifton et al. | |
| 2015/0127529 | A1* | 5/2015 | Makhotin | G06Q 20/322 |
| | | | | 705/39 |
| 2015/0172782 | A1* | 6/2015 | Oh | H04N 21/8456 |
| | | | | 725/32 |
| 2015/0200972 | A1* | 7/2015 | Suryavanshi | H04L 63/0428 |
| | | | | 726/1 |
| 2015/0227741 | A1* | 8/2015 | Permeh | G06F 21/51 |
| | | | | 726/22 |
| 2015/0304307 | A1* | 10/2015 | Kaur | H04W 12/06 |
| | | | | 726/8 |
| 2016/0070911 | A1* | 3/2016 | Okereke | G06F 21/56 |
| | | | | 726/23 |
| 2016/0119477 | A1* | 4/2016 | Sharpe | G06Q 30/0261 |
| | | | | 379/265.09 |
| 2016/0119478 | A1* | 4/2016 | Sharpe | H04L 67/141 |
| | | | | 379/265.09 |
| 2016/0239733 | A1* | 8/2016 | Hertz | H04W 4/029 |
| 2016/0360352 | A1* | 12/2016 | Khan | H04W 4/80 |
| 2017/0270334 | A1* | 9/2017 | Setterberg | G06V 10/95 |
| 2018/0182386 | A1* | 6/2018 | Lee | G10L 15/22 |
| 2018/0241730 | A1* | 8/2018 | Clere | H04L 63/123 |
| 2018/0324153 | A1* | 11/2018 | Althouse | H04L 9/3236 |
| 2019/0363886 | A1* | 11/2019 | Atwood | H04W 12/06 |
| 2021/0321160 | A1* | 10/2021 | Cormie | H04N 21/8358 |
| 2022/0217143 | A1* | 7/2022 | Williams | H04L 63/0884 |
| 2022/0337626 | A1* | 10/2022 | Kang | H04L 69/08 |
| 2025/0016157 | A1* | 1/2025 | Katukam | H04L 63/0876 |

* cited by examiner

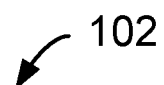

102

PACKET RECEIVER — 202

PROTOCOL ANALYSIS AND DATA EXTRACTION (PADE) MODULE — 204

230 — PROTOCOL AND SESSION IDENTIFICATION (PSI)

232 — PRIORITIZED ANALYSIS QUEUE (PAQ)

234 — PARSING AND MATCHING (PAM)

218 — PACKET AND SESSION STORE

DATA BUFFER — 206

236 — SIGNAL RECORDS

238 — TRANSACTION RECORDS

240 — CONNECTION RECORDS

220 — OBJECT STORE

222 — TRANSACTION STORE

STATISTICS ENGINE

208

TRANSACTION PROCESSOR

210

ANALYTICS ENGINE — 212

HYPOTHESIS TESTER — 242

STORY BUILDER — 244

KNOWLEDGE GRAPH

214

SIGNAL AND STORY STORE — 216

224 — EXTERNAL INTEGRATION INTERFACE

226 — THREAT INFO FEED INTERFACE

APPLICATION PROGRAMMING INTERFACE (API) — 228

FIGURE 2

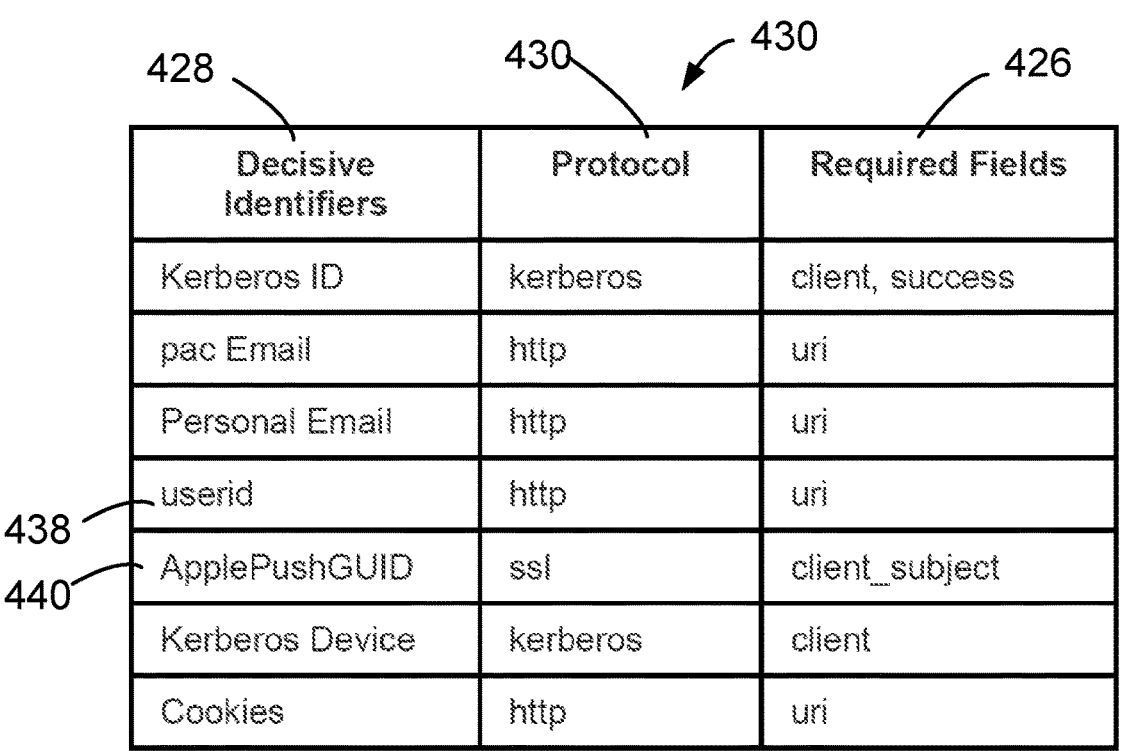

| Decisive Identifiers | Protocol | Required Fields |
|---|---|---|
| Kerberos ID | kerberos | client, success |
| pac Email | http | uri |
| Personal Email | http | uri |
| userid | http | uri |
| ApplePushGUID | ssl | client_subject |
| Kerberos Device | kerberos | client |
| Cookies | http | uri |

FIGURE 4B

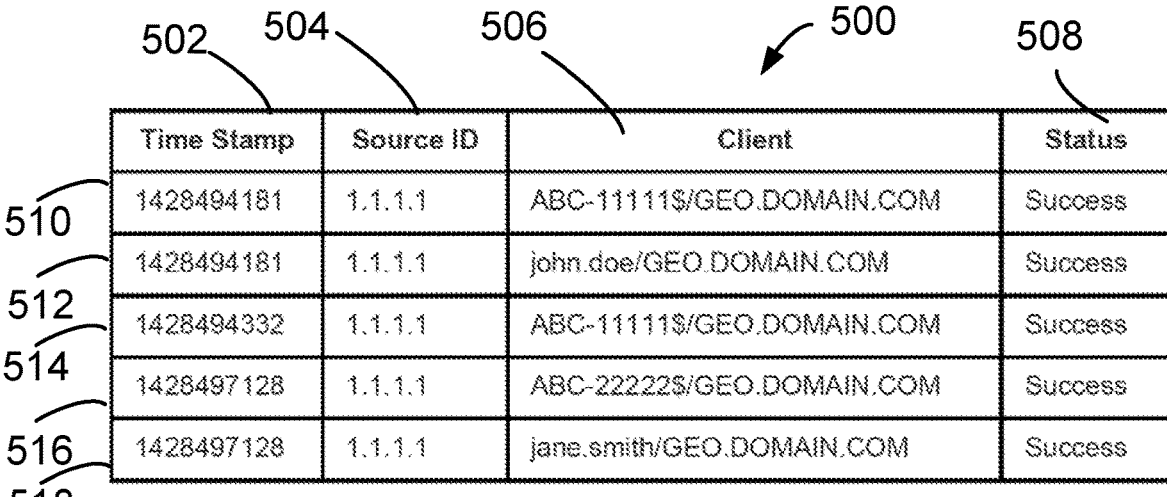

| Time Stamp | Source ID | Client | Status |
|---|---|---|---|
| 1428494181 | 1.1.1.1 | ABC-11111$/GEO.DOMAIN.COM | Success |
| 1428494181 | 1.1.1.1 | john.doe/GEO.DOMAIN.COM | Success |
| 1428494332 | 1.1.1.1 | ABC-11111$/GEO.DOMAIN.COM | Success |
| 1428497128 | 1.1.1.1 | ABC-22222$/GEO.DOMAIN.COM | Success |
| 1428497128 | 1.1.1.1 | jane.smith/GEO.DOMAIN.COM | Success |

FIGURE 5

| Time Stamp | Source ID | Decisive Identifier | Comments |
|---|---|---|---|
| 1428494181.223 | 1.1.1.1 | Kerberos: A | Associate *Kerberos:A* to ID 1.1.1.1 in the interval [1428494181-1428494182] |
| 1428494183.188 | 1.1.1.1 | - | http session |
| 1428494184.889 | 1.1.1.1 | - | sip session |
| 1428494198.226 | 1.1.1.1 | Personal Email: M | Associate *Personal Email: M* to ID 1.1.1.1 in the interval [1428494198-1428494199] |
| 1428494261.781 | 1.1.1.1 | Kerberos: A | Associate *Kerberos:A* to ID 1.1.1.1 in the interval [1428494262-1428494263]<br><br>*Extend Kerberos:A* to ID 1.1.1.1 in the interval [1428494182-1428494263] |
| 1428494322.689 | 1.1.1.1 | - | ftp session |
| 1428494543.299 | 1.1.1.1 | Personal Email: M | Associate *Personal Email: M* to ID 1.1.1.1 in the interval [1428494543-1428494544]<br><br>*Extend Personal Email:M* to ID 1.1.1.1 in the interval [1428494199-1428494544] |
| 1428494666.121 | 1.1.1.1 | - | http session |

| Time Stamp | Source ID | Decisive Identifier | Comments |
|---|---|---|---|
| 1428494798.222 | 1.1.1.1 | - | sip session |
| 1428494798.223 - 1428496871.900 | 1.1.1.1 | - | No activity |
| 1428496871.901 | 1.1.1.1 | Kerberos: A | Associate *Kerberos:A* to ID 1.1.1.1 in the interval [1428496871-1428496872]<br><br>*Extend Kerberos:A* to ID 1.1.1.1 in the interval [1428494263-1428494799] |
| 1428496922.561 | 1.1.1.1 | - | http session |
| 1428496972.222 | 1.1.1.1 | - | sip session |
| 1428496972.223 - 1428497128.571 | 1.1.1.1 | - | No activity |
| 1428497128.572 | 1.1.1.1 | Kerberos: B | Associate *Kerberos:B* to ID 1.1.1.1 in the interval [1428497128-1428497129]<br><br>*Extend Kerberos:A* to ID 1.1.1.1 in the interval [1428496872-1428496973] |

700

| Time Stamp | Source ID | First Security Entity | Second Security Entity | First Decisive Identifier | Second Decisive Identifier |
|---|---|---|---|---|---|
| T1 | 1.1.1.1 | First User Computer | First User | Kerberos:A | |
| T2 | 1.1.1.1 | First User Computer | First User | | Personal Email: M |
| T3 | 1.1.1.1 | First User Computer | First User | Kerberos:A | |
| T4 | 1.1.1.1 | First User Computer | First User | | Personal Email:M |
| T5 | 1.1.1.1 | No activity | | | |
| T6 | 1.1.1.1 | First User Computer | First User | Kerberos:A | |
| T7 | 1.1.1.1 | No Activity | | | |
| T8 | 1.1.1.1 | Second User Computer | Second User | Kerberos:B | |

| Time stamp | Source ID | First Security Entity | Second Security Entity | First Decisive Identifier | Second Decisive Identifier |
|---|---|---|---|---|---|
| T1-T5 | 1.1.1.1 | First User Computer | First User | Kerberos:A | |
| T2-T4 | 1.1.1.1 | First User Computer | First User | | Personal Email: M |
| T5-T6 | 1.1.1.1 | No activity | | | |
| T6-T7 | 1.1.1.1 | First User Computer | First User | Kerberos:A | |
| T7-T8 | 1.1.1.1 | No activity | | | |
| T8-T9 | 1.1.1.1 | Second User Computer | Second User | Kerberos:B | |

FIGURE 7B

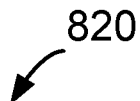

820

| SNI Value | Application / Library |
|---|---|
| browserdomain.net | Browser |
| specificbrowser.com | Some Specific Browser |
| justalibrary.com | SSL Library 1 |
| thirdpartyapp.net | Computer Cleaner Plus |

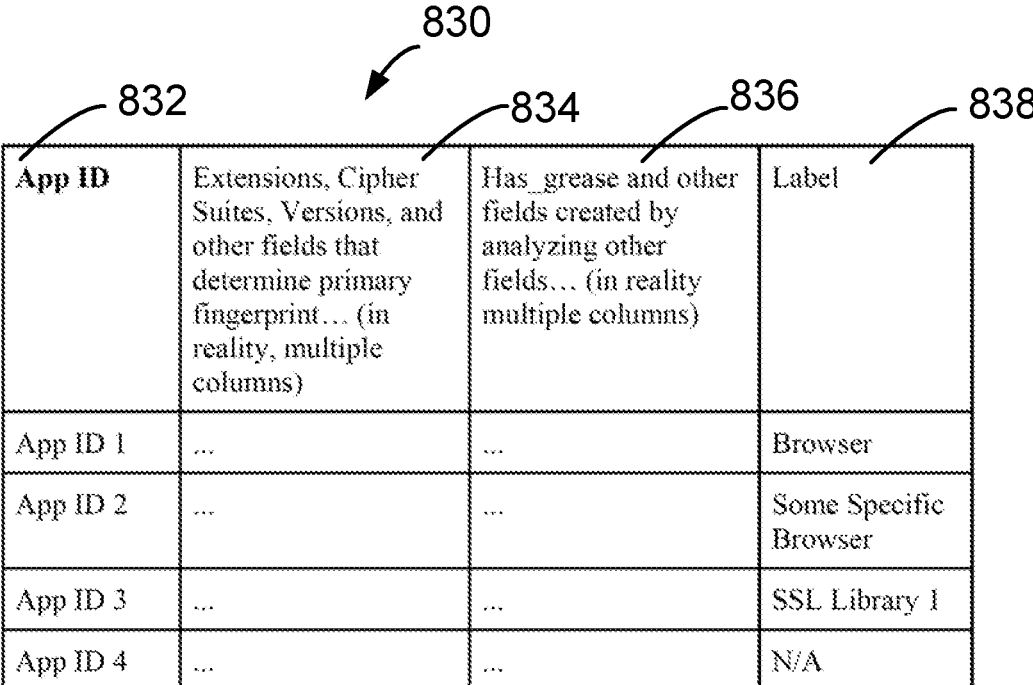

| App ID | Extensions, Cipher Suites, Versions, and other fields that determine primary fingerprint... (in reality, multiple columns) | Has_grease and other fields created by analyzing other fields... (in reality multiple columns) | Label |
|---|---|---|---|
| App ID 1 | ... | ... | Browser |
| App ID 2 | ... | ... | Some Specific Browser |
| App ID 3 | ... | ... | SSL Library 1 |
| App ID 4 | ... | ... | N/A |

FIGURE 8C

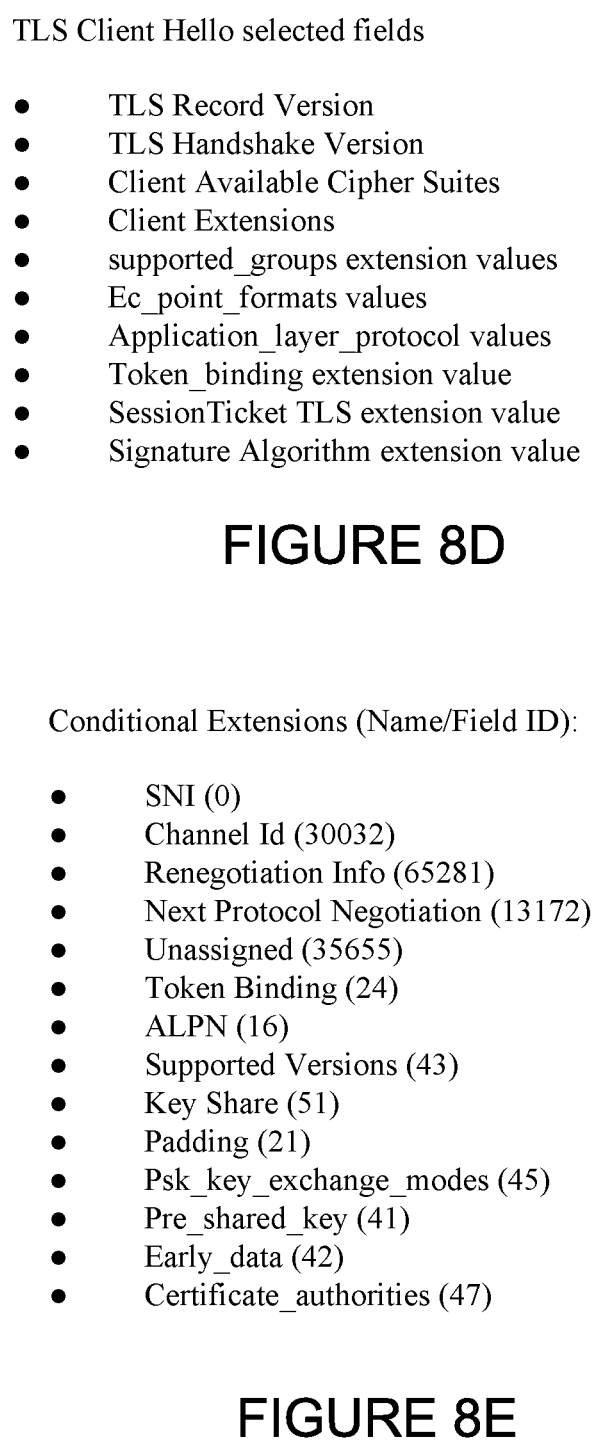

TLS Client Hello selected fields

- TLS Record Version
- TLS Handshake Version
- Client Available Cipher Suites
- Client Extensions
- supported_groups extension values
- Ec_point_formats values
- Application_layer_protocol values
- Token_binding extension value
- SessionTicket TLS extension value
- Signature Algorithm extension value

FIGURE 8D

Conditional Extensions (Name/Field ID):

- SNI (0)
- Channel Id (30032)
- Renegotiation Info (65281)
- Next Protocol Negotiation (13172)
- Unassigned (35655)
- Token Binding (24)
- ALPN (16)
- Supported Versions (43)
- Key Share (51)
- Padding (21)
- Psk_key_exchange_modes (45)
- Pre_shared_key (41)
- Early_data (42)
- Certificate_authorities (47)

FIGURE 8E

GREASE VALUES

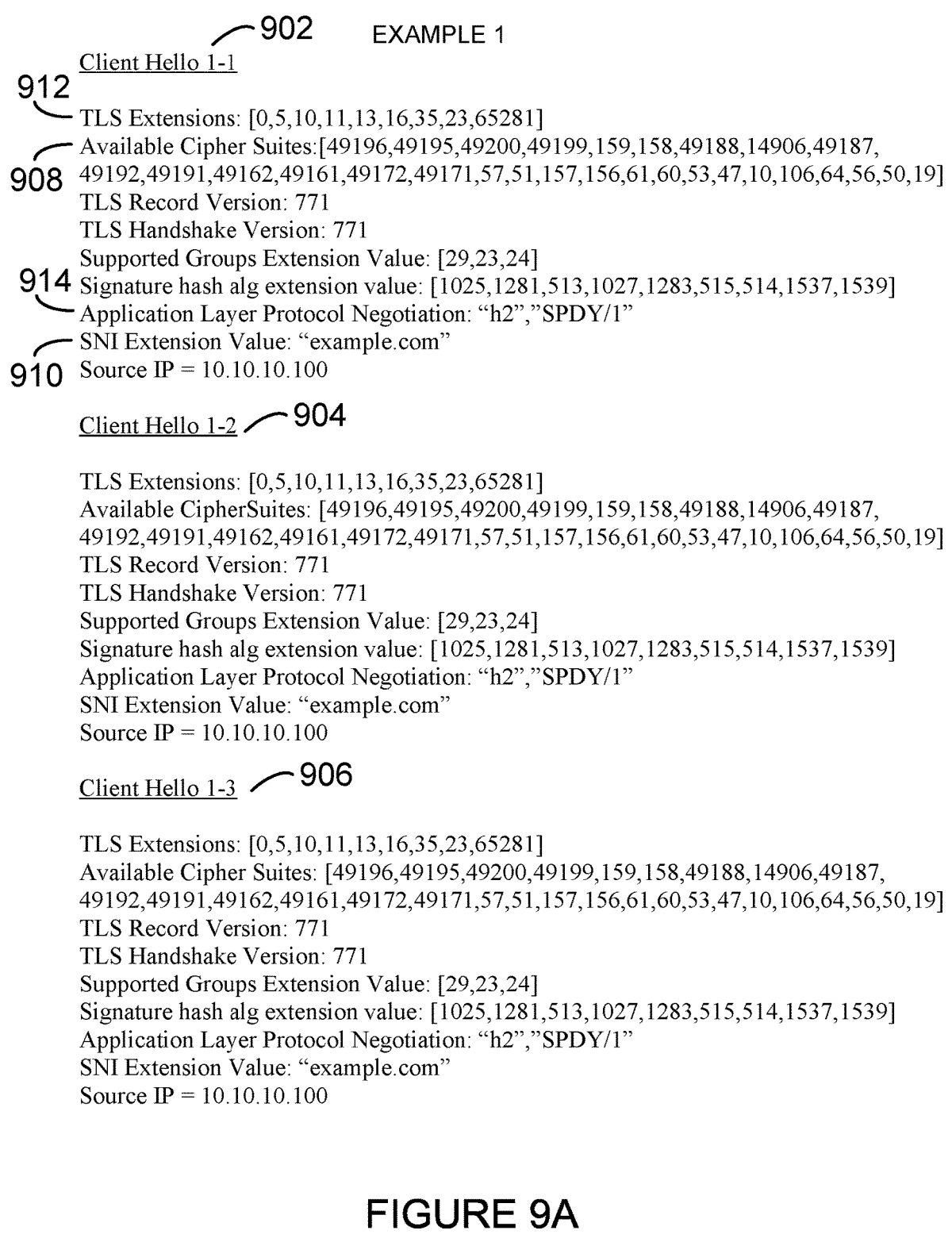

*902        EXAMPLE 1

<u>Client Hello 1-1</u>

912

TLS Extensions: [0,5,10,11,13,16,35,23,65281]

Available Cipher Suites:[49196,49195,49200,49199,159,158,49188,14906,49187, 908    49192,49191,49162,49161,49172,49171,57,51,157,156,61,60,53,47,10,106,64,56,50,19]

TLS Record Version: 771

TLS Handshake Version: 771

Supported Groups Extension Value: [29,23,24]

914    Signature hash alg extension value: [1025,1281,513,1027,1283,515,514,1537,1539]

Application Layer Protocol Negotiation: "h2","SPDY/1"

SNI Extension Value: "example.com"

910    Source IP = 10.10.10.100

<u>Client Hello 1-2</u>    *904

TLS Extensions: [0,5,10,11,13,16,35,23,65281]

Available CipherSuites: [49196,49195,49200,49199,159,158,49188,14906,49187, 49192,49191,49162,49161,49172,49171,57,51,157,156,61,60,53,47,10,106,64,56,50,19]

TLS Record Version: 771

TLS Handshake Version: 771

Supported Groups Extension Value: [29,23,24]

Signature hash alg extension value: [1025,1281,513,1027,1283,515,514,1537,1539]

Application Layer Protocol Negotiation: "h2","SPDY/1"

SNI Extension Value: "example.com"

Source IP = 10.10.10.100

<u>Client Hello 1-3</u>    *906

TLS Extensions: [0,5,10,11,13,16,35,23,65281]

Available Cipher Suites: [49196,49195,49200,49199,159,158,49188,14906,49187, 49192,49191,49162,49161,49172,49171,57,51,157,156,61,60,53,47,10,106,64,56,50,19]

TLS Record Version: 771

TLS Handshake Version: 771

Supported Groups Extension Value: [29,23,24]

Signature hash alg extension value: [1025,1281,513,1027,1283,515,514,1537,1539]

Application Layer Protocol Negotiation: "h2","SPDY/1"

SNI Extension Value: "example.com"

Source IP = 10.10.10.100

FIGURE 9A

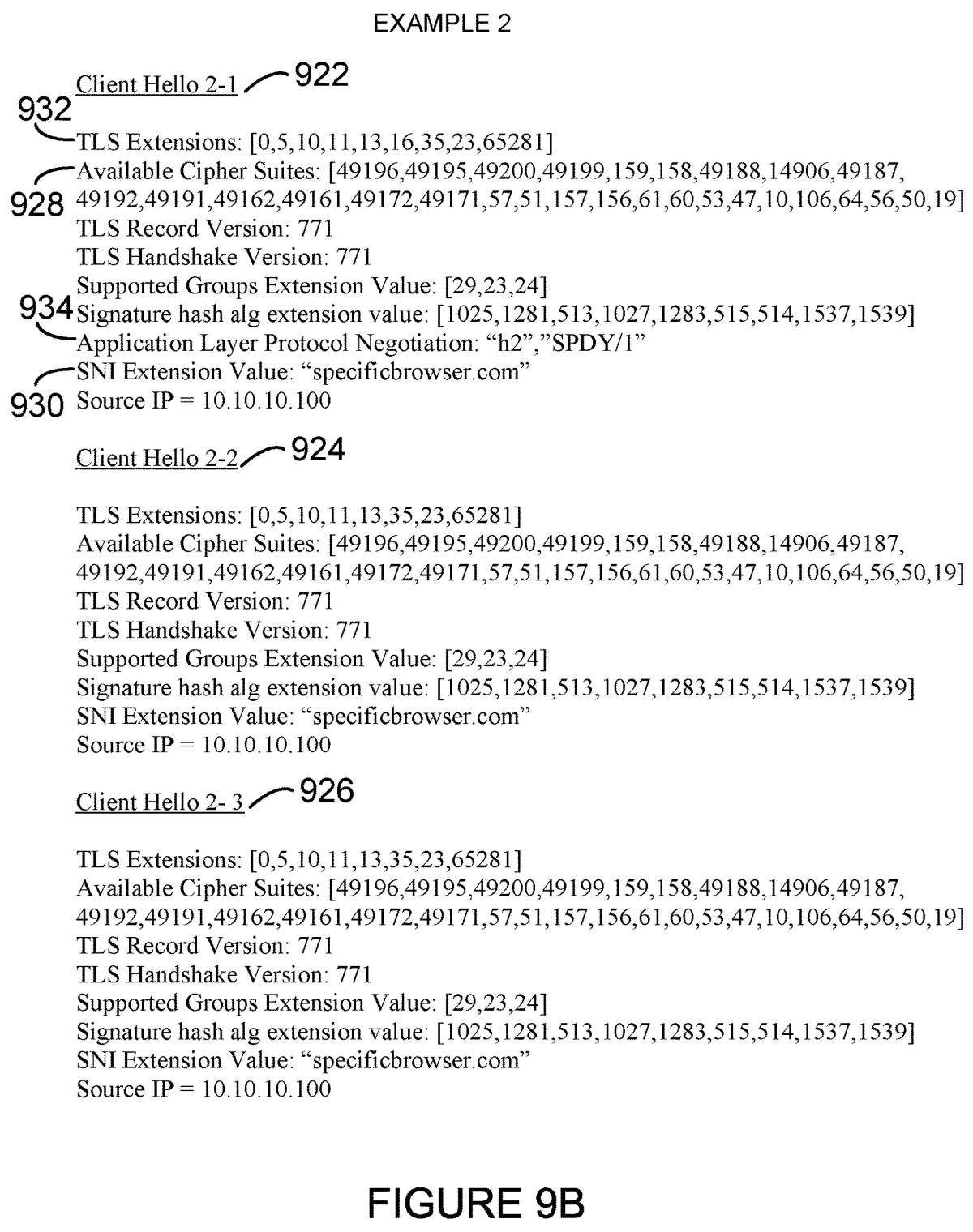

EXAMPLE 2

Client Hello 2-1 ⌒922

932

TLS Extensions: [0,5,10,11,13,16,35,23,65281]
Available Cipher Suites: [49196,49195,49200,49199,159,158,49188,14906,49187,
928  49192,49191,49162,49161,49172,49171,57,51,157,156,61,60,53,47,10,106,64,56,50,19]
TLS Record Version: 771
TLS Handshake Version: 771
Supported Groups Extension Value: [29,23,24]
934 Signature hash alg extension value: [1025,1281,513,1027,1283,515,514,1537,1539]
Application Layer Protocol Negotiation: "h2","SPDY/1"
SNI Extension Value: "specificbrowser.com"
930  Source IP = 10.10.10.100

Client Hello 2-2 ⌒924

TLS Extensions: [0,5,10,11,13,35,23,65281]
Available Cipher Suites: [49196,49195,49200,49199,159,158,49188,14906,49187,
49192,49191,49162,49161,49172,49171,57,51,157,156,61,60,53,47,10,106,64,56,50,19]
TLS Record Version: 771
TLS Handshake Version: 771
Supported Groups Extension Value: [29,23,24]
Signature hash alg extension value: [1025,1281,513,1027,1283,515,514,1537,1539]
SNI Extension Value: "specificbrowser.com"
Source IP = 10.10.10.100

Client Hello 2- 3 ⌒926

TLS Extensions: [0,5,10,11,13,35,23,65281]
Available Cipher Suites: [49196,49195,49200,49199,159,158,49188,14906,49187,
49192,49191,49162,49161,49172,49171,57,51,157,156,61,60,53,47,10,106,64,56,50,19]
TLS Record Version: 771
TLS Handshake Version: 771
Supported Groups Extension Value: [29,23,24]
Signature hash alg extension value: [1025,1281,513,1027,1283,515,514,1537,1539]
SNI Extension Value: "specificbrowser.com"
Source IP = 10.10.10.100

FIGURE 9B

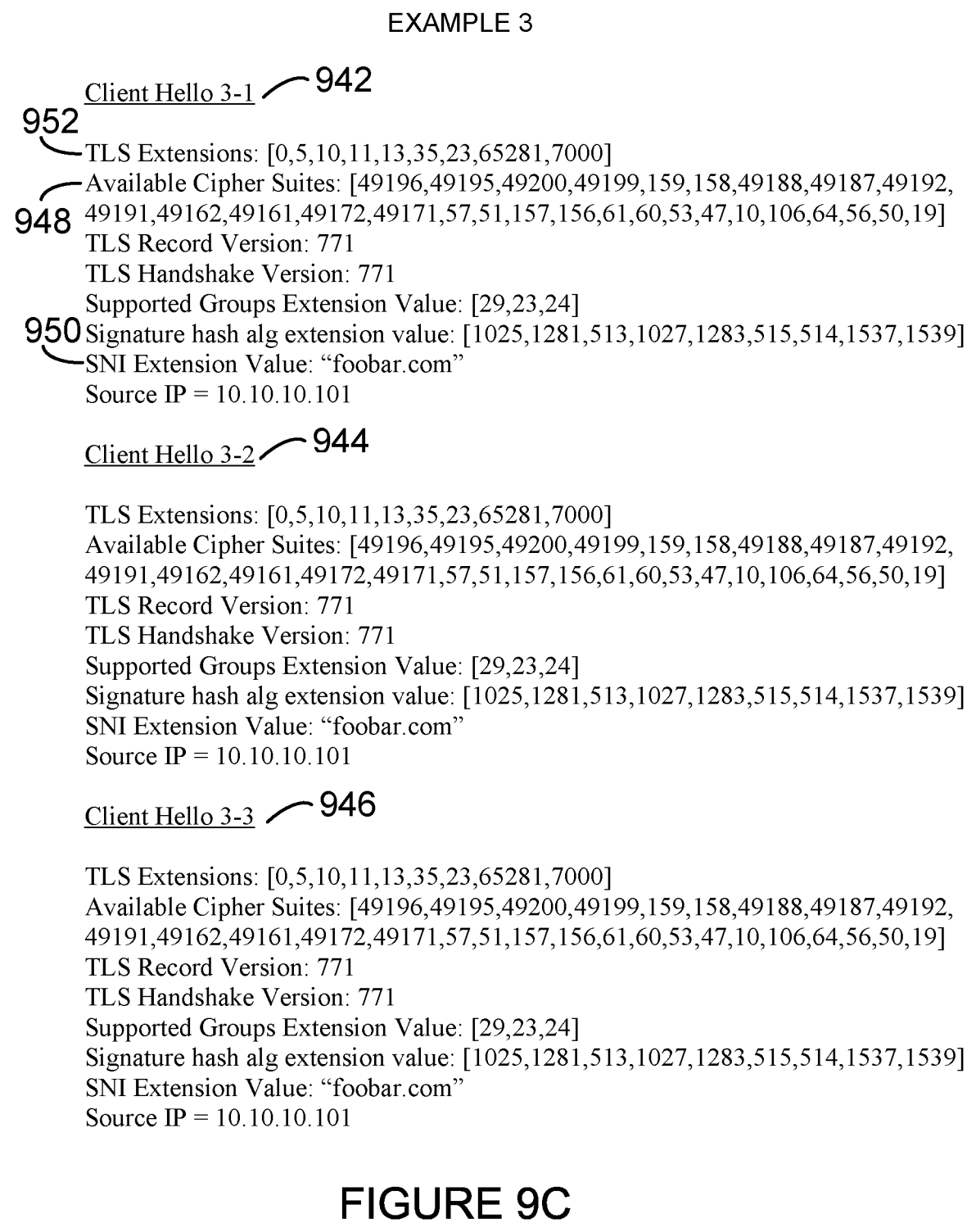

EXAMPLE 3

<u>Client Hello 3-1</u> 942

952

TLS Extensions: [0,5,10,11,13,35,23,65281,7000]
Available Cipher Suites: [49196,49195,49200,49199,159,158,49188,49187,49192,
948 49191,49162,49161,49172,49171,57,51,157,156,61,60,53,47,10,106,64,56,50,19]
TLS Record Version: 771
TLS Handshake Version: 771
Supported Groups Extension Value: [29,23,24]
950 Signature hash alg extension value: [1025,1281,513,1027,1283,515,514,1537,1539]
SNI Extension Value: "foobar.com"
Source IP = 10.10.10.101

<u>Client Hello 3-2</u> 944

TLS Extensions: [0,5,10,11,13,35,23,65281,7000]
Available Cipher Suites: [49196,49195,49200,49199,159,158,49188,49187,49192,
49191,49162,49161,49172,49171,57,51,157,156,61,60,53,47,10,106,64,56,50,19]
TLS Record Version: 771
TLS Handshake Version: 771
Supported Groups Extension Value: [29,23,24]
Signature hash alg extension value: [1025,1281,513,1027,1283,515,514,1537,1539]
SNI Extension Value: "foobar.com"
Source IP = 10.10.10.101

<u>Client Hello 3-3</u> 946

TLS Extensions: [0,5,10,11,13,35,23,65281,7000]
Available Cipher Suites: [49196,49195,49200,49199,159,158,49188,49187,49192,
49191,49162,49161,49172,49171,57,51,157,156,61,60,53,47,10,106,64,56,50,19]
TLS Record Version: 771
TLS Handshake Version: 771
Supported Groups Extension Value: [29,23,24]
Signature hash alg extension value: [1025,1281,513,1027,1283,515,514,1537,1539]
SNI Extension Value: "foobar.com"
Source IP = 10.10.10.101

FIGURE 9C

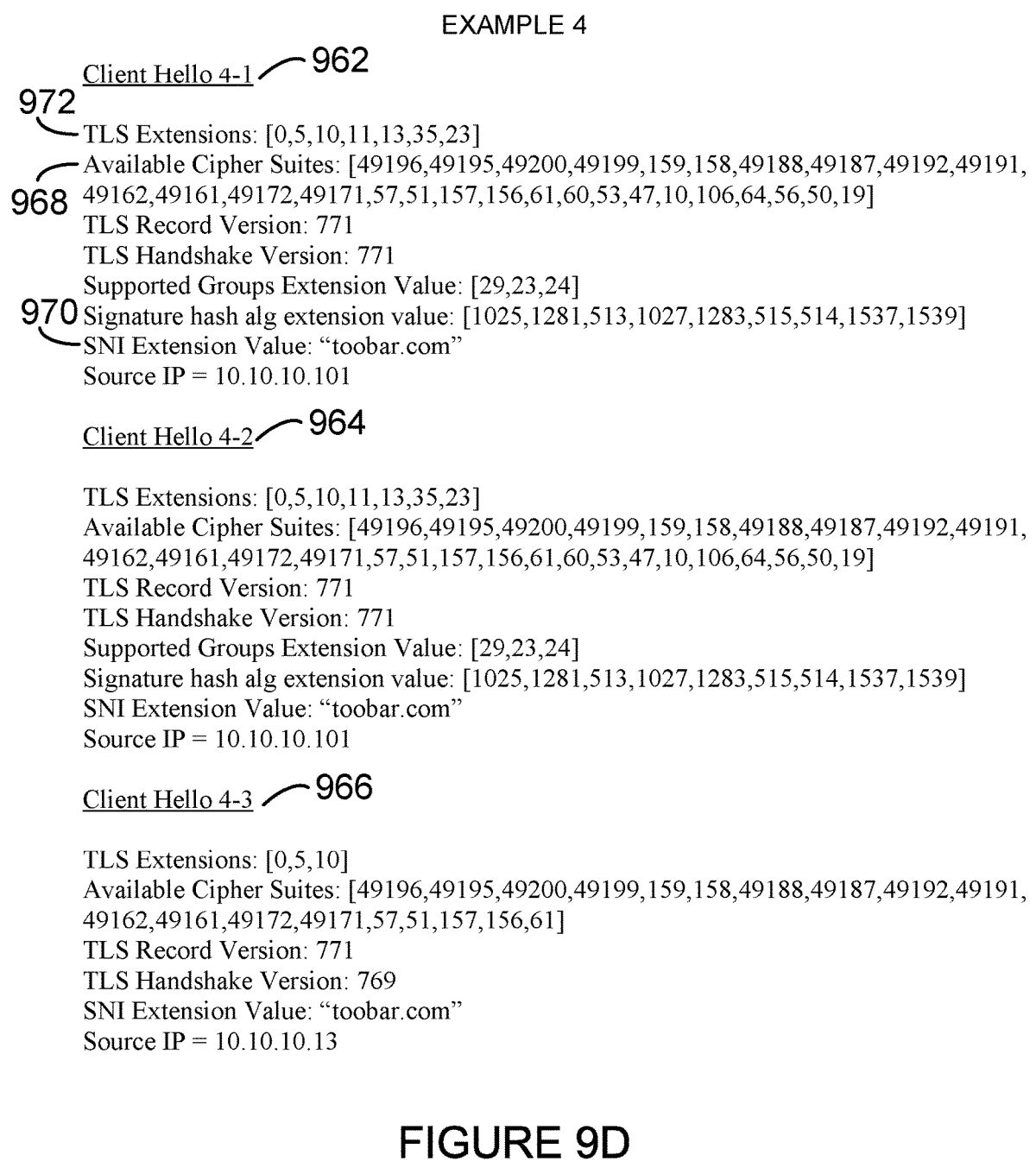

EXAMPLE 4

Client Hello 4-1 ⟋962

972

TLS Extensions: [0,5,10,11,13,35,23]
Available Cipher Suites: [49196,49195,49200,49199,159,158,49188,49187,49192,49191,
968    49162,49161,49172,49171,57,51,157,156,61,60,53,47,10,106,64,56,50,19]
TLS Record Version: 771
TLS Handshake Version: 771
Supported Groups Extension Value: [29,23,24]
970 Signature hash alg extension value: [1025,1281,513,1027,1283,515,514,1537,1539]
SNI Extension Value: "toobar.com"
Source IP = 10.10.10.101

Client Hello 4-2 ⟋964

TLS Extensions: [0,5,10,11,13,35,23]
Available Cipher Suites: [49196,49195,49200,49199,159,158,49188,49187,49192,49191,
49162,49161,49172,49171,57,51,157,156,61,60,53,47,10,106,64,56,50,19]
TLS Record Version: 771
TLS Handshake Version: 771
Supported Groups Extension Value: [29,23,24]
Signature hash alg extension value: [1025,1281,513,1027,1283,515,514,1537,1539]
SNI Extension Value: "toobar.com"
Source IP = 10.10.10.101

Client Hello 4-3 ⟋966

TLS Extensions: [0,5,10]
Available Cipher Suites: [49196,49195,49200,49199,159,158,49188,49187,49192,49191,
49162,49161,49172,49171,57,51,157,156,61]
TLS Record Version: 771
TLS Handshake Version: 769
SNI Extension Value: "toobar.com"
Source IP = 10.10.10.13

FIGURE 9D

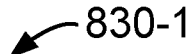

| App ID | Extensions, Cipher Suites, Versions, and other fields that determine primary fingerprint... (in reality, multiple columns) | Has_grease and other fields created by analyzing other fields... (in reality multiple columns) | Label | Client Hello |
|---|---|---|---|---|
| App ID 1 | ... | ... | Browser | |
| App ID 2 | ... | ... | Some Specific Browser | Client hello 2-1, 2-2 and 2-3 |
| App ID 3 | ... | ... | SSL Library 1 | |
| App ID 4 | ... | ... | N/A | |
| App ID 5 | ... | ... | | Client hello 1-1, 1-2 and 1-3 |
| App ID 6 | ... | ... | Computer Cleaner Plus | Client hello 3-1, 3-2 and 3-3 |
| App ID 7 | ... | ... | | Client hello 4-1 and 4-2 |
| App ID 8 | ... | ... | | Client hello 4-3 |

FIGURE 9E

SYSTEM AND METHOD FOR IDENTIFYING AN APPLICATION INITIATING A COMMUNICATION IN A COMPUTING ENVIRONMENT

RELATED APPLICATIONS

The present application is a continuation of U.S. patent application Ser. No. 16/702,855, filed Dec. 4, 2019 and entitled "SYSTEM AND METHOD FOR IDENTIFYING AN APPLICATION INITIATING A COMMUNICATION IN A COMPUTING ENVIRONMENT," which in turn claims priority to U.S. Provisional Patent Application No. 62/775,225 filed Dec. 4, 2018 and entitled "SYSTEM AND METHOD FOR IDENTIFYING AN APPLICATION INITIATING A COMMUNICATION IN A COMPUTING ENVIRONMENT." Both of these applications are incorporated herein by reference in their entireties for all purposes.

TECHNICAL FIELD

The present invention relates generally to identifying security entities m a computing environment and, more particularly, identifying security entities based on network communication in the computing environment.

DESCRIPTION OF RELATED ART

In the present day computing environment, an enterprise has to deal with monitoring and tracking enormous amount of activities occurring between various computing devices. Computing environment may include various security entities. A security entity may be a person, an application or a computing device whose behavior needs to be understood by a network administrator to maintain integrity of the network environment. In some examples, identifying a security entity and associating a security entity with other security entities may be required to maintain integrity of the network environment.

In order to conduct a focused analysis of one or more security entities, there is a need to identify a security entity and associate a security entity with other security entities. As the number of security entities and number of transactions over a computing environment increases, selectively identifying one or more security entities becomes challenging. In some examples, characterizing a security entity may be advantageous in maintaining integrity of the network environment. It is with these needs in mind, this disclosure arises.

SUMMARY OF THE INVENTION

In one embodiment, a method for identifying a security entity in a computing environment is disclosed. Communication between a user computer and at least one destination computer is monitored by a security appliance. Selective information from the communication is extracted by the security appliance. A primary fingerprint is generated using a subset of the selective information extracted. The generated primary fingerprint is evaluated for a match in an application ID database. When there is a match, corresponding application ID is assigned to the communication, wherein the application ID is associated with an application that generated the communication.

In yet another embodiment, a system to identify a security entity in a computing environment is disclosed. Communication between a user computer and at least one destination computer is monitored by a security appliance. Selective information from the communication is extracted by the security appliance. A primary fingerprint is generated using a subset of the selective information extracted. The generated primary fingerprint is evaluated for a match in an application ID database. When there is a match, corresponding application ID is assigned to the communication, wherein the application ID is associated with an application that generated the communication.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 2 depicts block diagram of an example security appliance of this disclosure;

FIG. 4B shows an example table with various decisive identifiers, corresponding protocol of the network packet and one or more fields of the network packet required to identify the corresponding decisive identifier;

FIG. 5 shows a table with various time stamps with decisive identifiers associated with source identifiers;

FIGS. 6A and 6B show table with various time stamp and corresponding decisive identifiers;

FIG. 7A shows an example knowledge graph according to an example implementation of this disclosure;

FIG. 7B shows an enhanced knowledge graph, according to an example implementation of this disclosure;

FIG. 8B shows an example SNI value database;

FIG. 8C shows an example application ID database;

FIG. 8D shows a primary subset of the TLS fields;

FIG. 8E shows a secondary subset of the TLS fields;

FIG. 8H shows GREASE values;

FIGS. 9A, 9B, 9C and 9D show various examples of client hello communications;

FIG. 9E shows an updated application ID database, based on analysis of client hellos shown in FIGS. 9A, 9B, 9C, and 9D;

Figure 1:
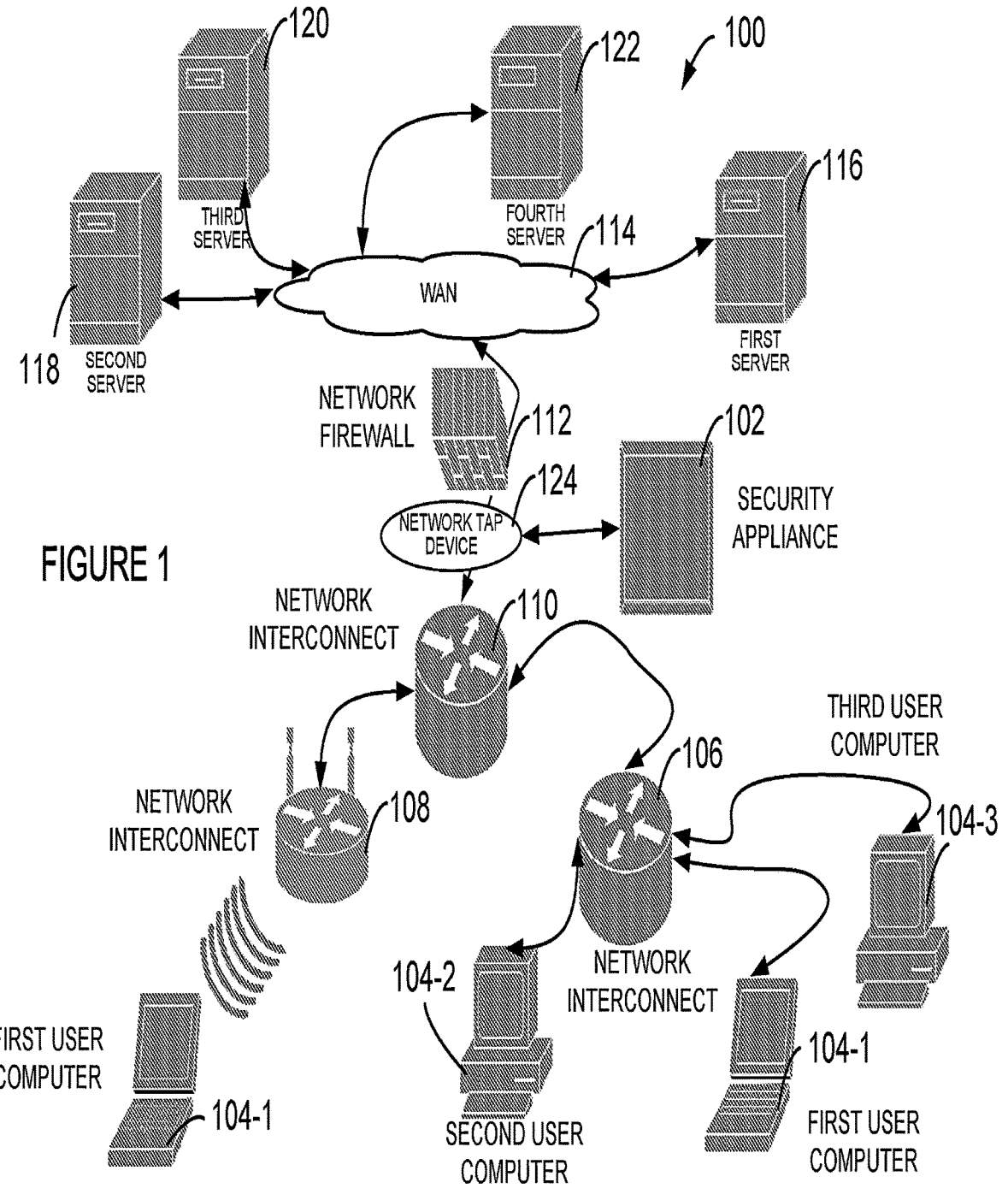
FIG. 1 shows an example computing environment with example security appliance of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for evaluating security entities in a computing environment. Referring now to the drawings, where similar reference characters denote corresponding features consistently throughout the figures, various examples of this disclosure is described.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown). The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
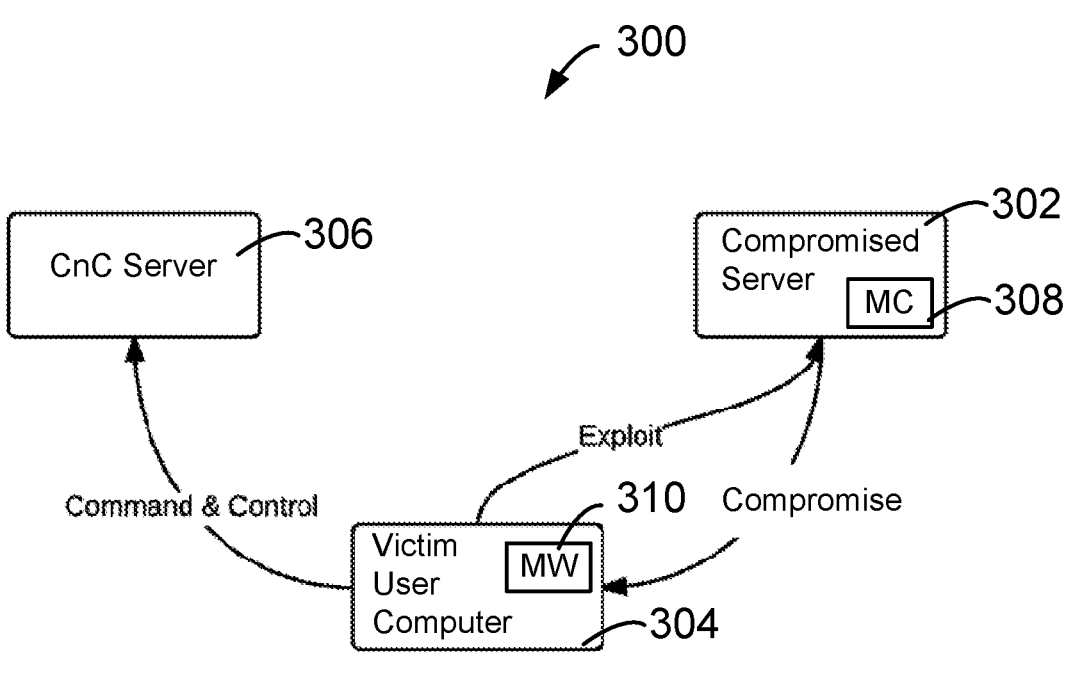
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

Having described various phases of likely malicious attack and general operation of the security appliance 102, an example evaluation of various security entities in a computing environment will now be described. The security entities in one example, may be computing devices in the computing environment, for example, first user computer 104-1, second user computer 104-2, third user computer 104-3, first server 116, second server 118, third server 120, and fourth server 122. In some examples, the security entity may be the first user, second user and the third user. In some examples, it may be accounts used by the first user, second user and the third user. In some examples, the security entity may be an application executed on a computing device. For example, a mail application, a web browser application and the like. In some examples, the security entity may be a group of users belonging to a specific group or an organization.

Figure 4:
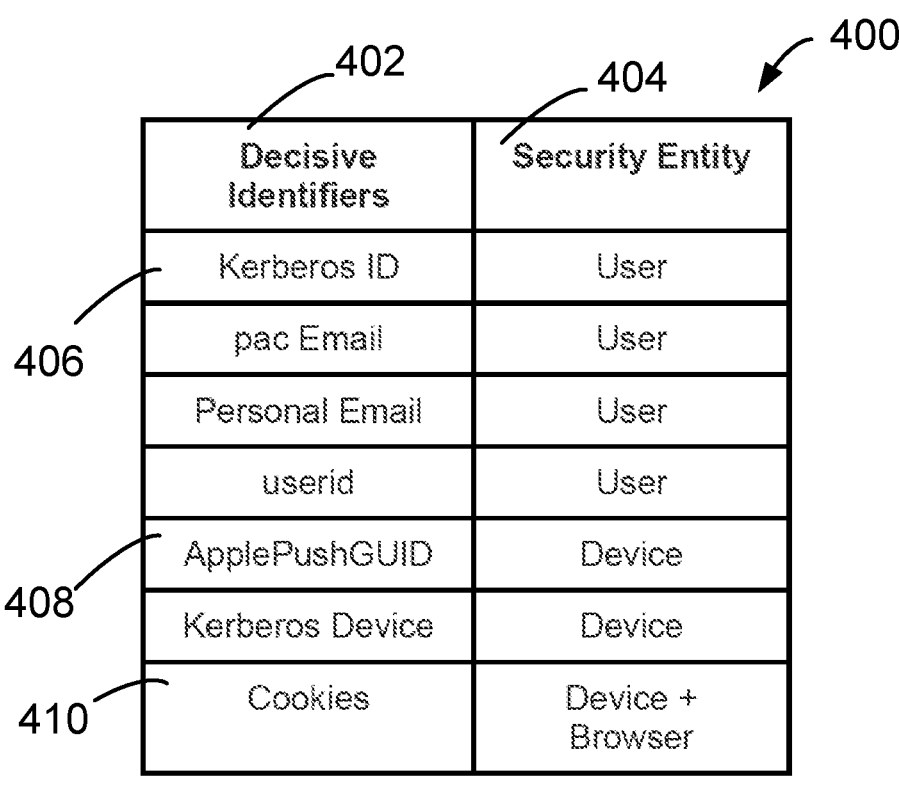
FIG. 4 shows an example table with a plurality of decisive identifiers and corresponding security entities the decisive identifiers identify.

Now, referring to FIG. 4, table 400 shows a plurality of decisive identifiers and corresponding security entities the decisive identifiers identify. Referring to table 400, column 402 shows decisive identifiers and column 404 shows security entities. As an example, referring to row 406, a Kerberos ID field in a network packet may identify a specific user as a security entity that corresponds to that network packet. As another example, referring to row 408, ApplePushGUID field in a network packet may identify a specific device as a security entity that corresponds to that network packet. As yet another example, referring to row 410, Cookies in a network packet may identify a specific device as a security entity in addition to a specific browser as another security entity that corresponds to that network packet. In general, a decisive identifier particularly identifies a specific security entity, based on evaluation of a network packet and selectively extracting a portion of the network packet.

Figure 4A:
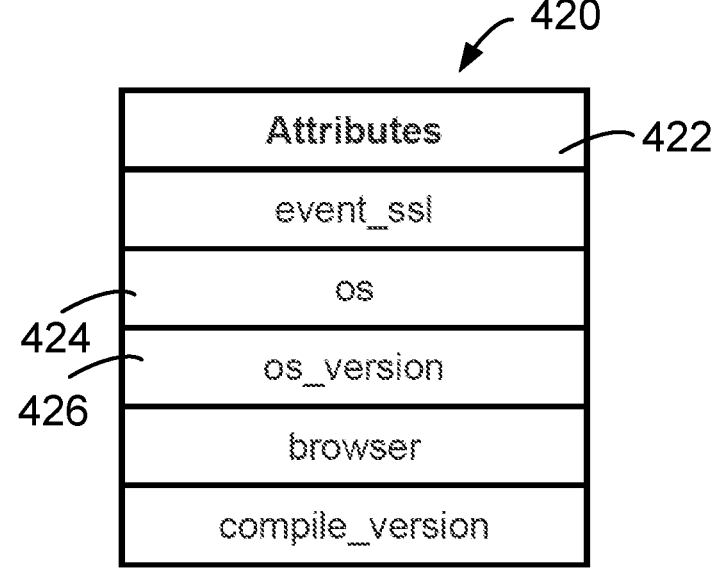
FIG. 4A shows an example table with a plurality of attributes associated with one or more security entities.

Now, referring to FIG. 4A, an example table 420, column 422 shows a plurality of attributes associated with one or more security entities. For example, referring to row 424, an attribute "OS" or operating system may be identified by evaluating a network packet and selectively extracting a portion of the network packet. As yet another example, referring to row 426, an attribute "OS_version" or operating system version may be identified by evaluating a network packet and selectively extracting a portion of the network packet. As one skilled in the art appreciates, an attribute may not uniquely identify a security entity, but may indicate a characteristic of a security entity.

Now, referring to FIG. 4B, table 430 shows various decisive identifiers, corresponding protocol of the network packet and one or more fields of the network packet required to identify the corresponding decisive identifier. For example, column 432 shows decisive identifiers, column 434 shows protocol name and column 436 shows one or more required field in the network packet corresponding to the protocol. As an example, referring to row 438, a decisive identifier "userid" may be extracted from a network packet conforming to Hyper Text Transfer Protocol ("http") protocol, based on the field "uri" ("Uniform Resource Indicator") in the network packet. As an example, referring to row 440, a decisive identifier "ApplePushGUID" may be extracted from a network packet conforming to Secure Socket Layer (SSL) protocol, based on the field "client_subject" in the network packet. As previously described with reference to FIG. 4 and table 400, each of the decisive identifiers identify a corresponding security entity.

As one skilled in the art appreciates, it may be beneficial to associate one or more decisive identifiers to a corresponding network address of a network device. Now, referring to FIG. 5, table 500, an example table is shown with a decisive identifier associated with a network address, for example, source identifier, sometimes referred to as source ID. As one skilled in the art appreciates, entries for table 500 may be created based on extracting selective information from one or more network packets, as previously disclosed. Referring to table 500, column 502 shows a time stamp, column 504 shows source ID, column 506 shows client details and column 508 shows status of the communication.

Now, referring to row 510, at time 1428494181, source ID was 1.1.1.1, a device ID of ABC-111111 (with a source ID of 1.1.1.1) communicated with domain GEO.DO-MAIN.COM and the communication was successful. Now, referring to row 512, at time 1428494240, source ID was 1.1.1.1, a user ID of john.doe communicated with domain GEO.DOMAIN.COM and the communication was successful. Now, referring to row 514, at time 1428494332, source ID was 1.1.1.1, a device ID of ABC-111111 (with a source ID of 1.1.1.1) communicated with domain GEO.DOM-AIN.COM and the communication was successful. Now, referring to row 516, at time 1428497128, source ID was 1.1.1.1, a device ID of ABC-22222 (with a source ID of 1.1.1.1) communicated with domain GEO.DOMAIN.COM and the communication was successful. Now, referring to row 518, at time 1428497128, source ID was 1.1.1.1, a user ID of jane.smith communicated with domain GEO.DO-MAIN.COM and the communication was successful.

In summary, we notice that a source ID of 1.1.1.1 was assigned to device ID of ABC-11111 during one time period and source ID of 1.1.1.1. was assigned to a device ID of ABC-22222 in a different time period. Also, we notice that user john.doe was using the device with a source ID of 1.1.1.1 in one time period and another user jane.doe was using the device with a source ID of 1.1.1.1 in a different time period. In one example, device ID of ABC-11111 may correspond to first user computer 104-1 and device ID of ABC-22222 may correspond to second user computer 104-2, as shown in FIG. 1. Further, john.doe may correspond to a first user and jane.doe may correspond to a second user.

In some examples, it may be beneficial to mark one or more identified security entities as belonging to a specific group. For example, a first group or a second group. In one example, based on the source ID, a security entity may be identified as belonging to a first group or a second group. In other words, based on an assigned network identifier, for example, IP address, a security entity may be assigned to one of the groups.

In one example, all IP addresses that are internal to an organization may be assigned to one of the groups, for example the first group. In some examples, IP addresses assigned to a known external organization may also be assigned to the first group. As another example, some well known domain names or organizations may have a range of IP addresses assigned to them. As yet another example, there may be an external organization with which the internal organization may have a relationship and the external organization may have a range of IP addresses assigned to them. So, if the IP address of a security entity falls within a range of IP address assigned to a known external organization, that security entity may also be assigned to the first group. In one example, the group a security entity belongs to may be advantageously stored in the knowledge graph, for possible use in a security investigation.

Figure 6B:
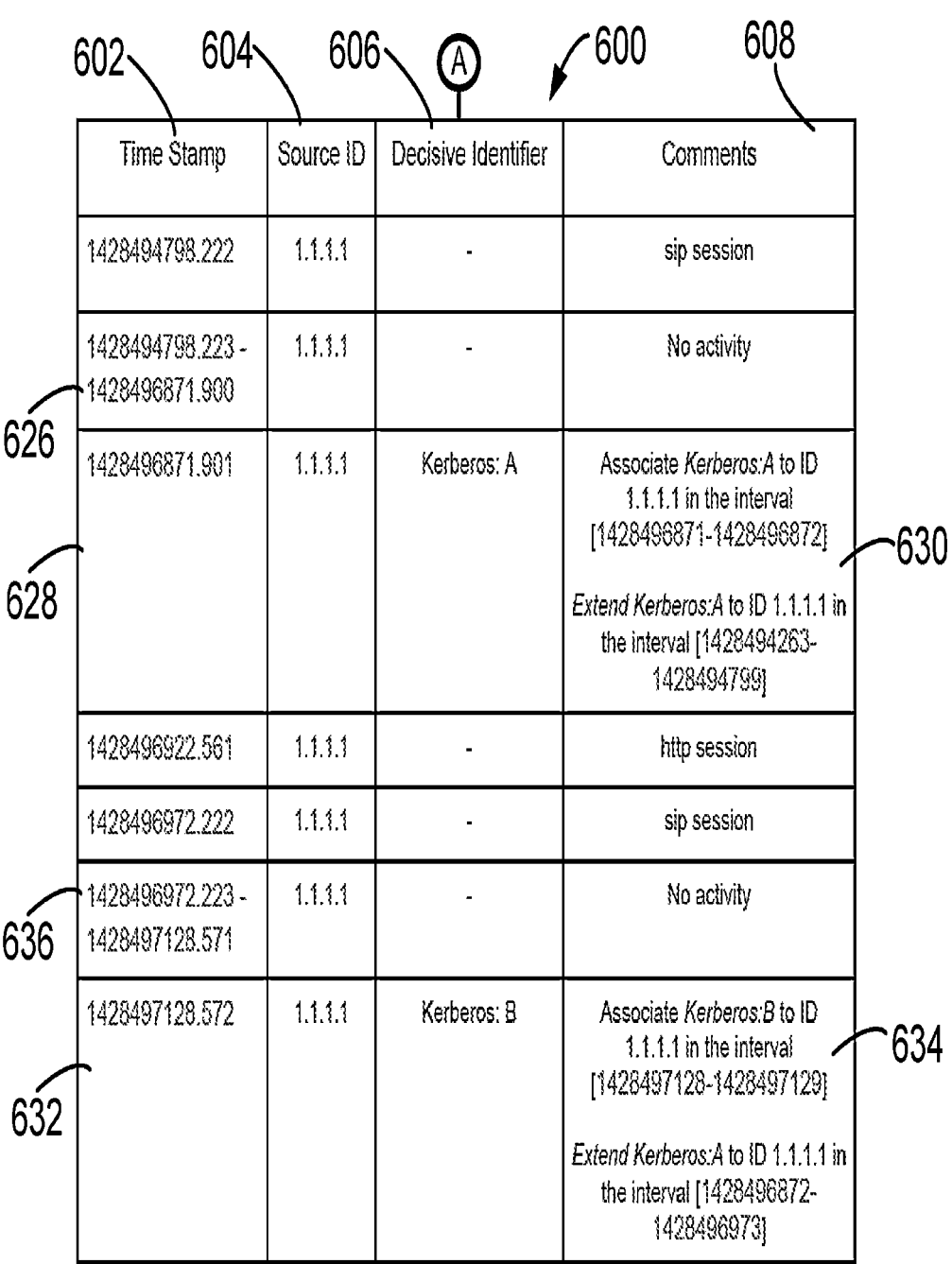
Figure 6C:
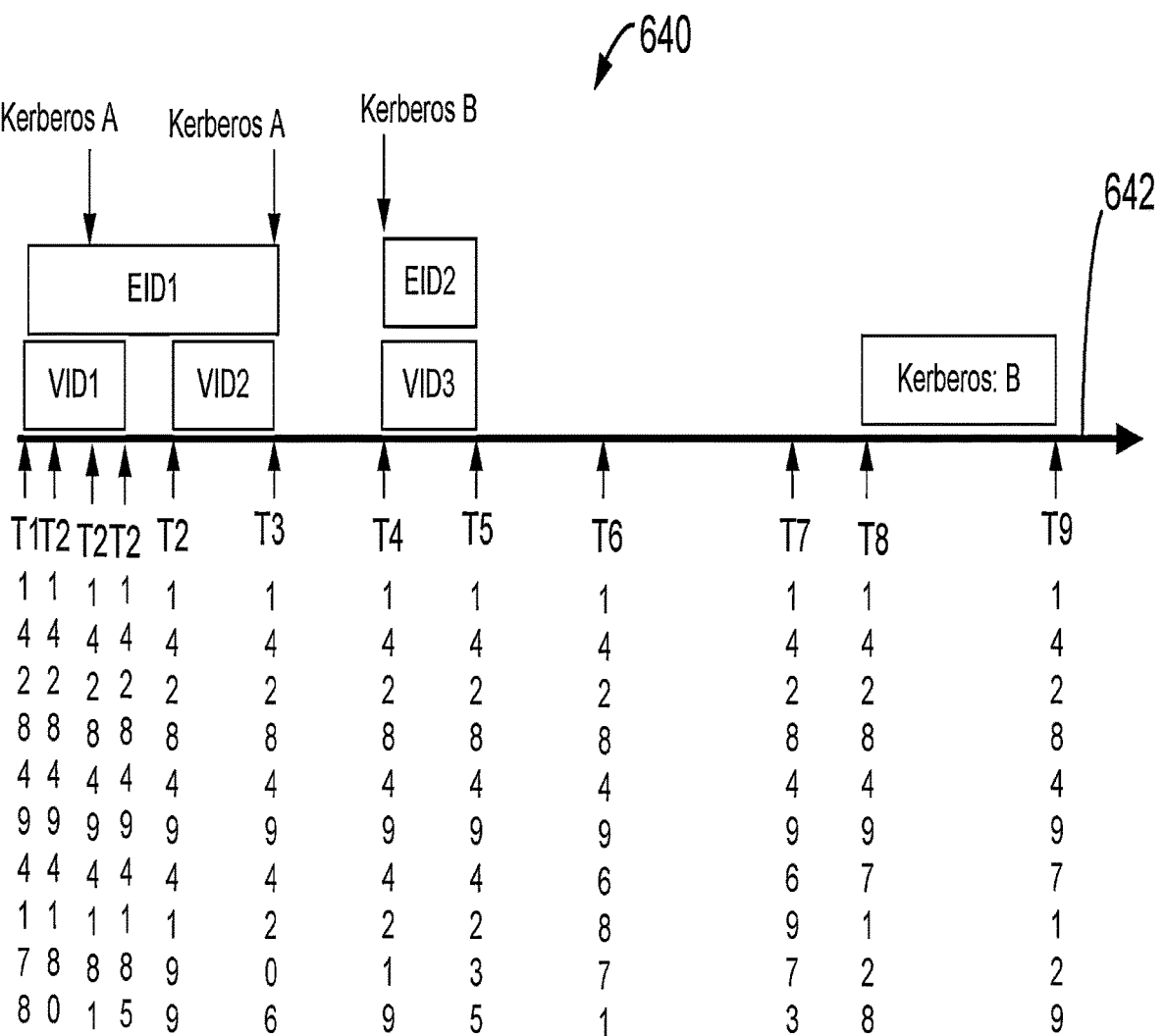
FIG. 6C shows a graph with various time stamps and corresponding decisive identifiers.

In some examples, it may be beneficial to extend association of a source ID to a security entity for more than one time period. Now, referring to FIG. 6, table 600, an example extension of association of a source ID to a security entity for more than one time period is disclosed. Referring to FIG. 6, table 600 is shown with various time stamp and corresponding decisive identifiers. Table 600 shows time stamp in column 602, source ID in column 604, decisive identifier in column 606 and comments in column 608. Referring to row 610, at time stamp of 142849481.223, the source ID was 1.1.1.1, decisive identifier was a Kerberos id of A. Now, in this example, the time stamp is shown in milliseconds and the time period is extended to one second. In other words, looking at the comment cell 612 of row 610, we notice that we associate the decisive identifier Kerberos: A to source ID 1.1.1.1 during the time interval 1428494181-1428494182. Now, referring to row 614, we notice that Personal Email id of Mis associated with source ID of 1.1.1.1 during the time interval 1 4284262-14284263.

Now, referring to row 616, during time stamp of 14284261.781, decisive identifier Kerberos: A is again associated with source ID of 1.1.1.1. Now, referring to cell 618, we notice that we associate the decisive identifier Kerberos: A to source ID 1.1.1.1 during the time interval 1 428494262-142849263. In addition, as there are no other kerberos identifiers other than A, we extend the association of kerberos: A to source ID 1.1.1.1 from the last time period when kerberos: A was identified to the current time period. In other words, the association is extended from time stamp 1428494182 to 1428494262.

Now, referring to row 620 and cell 622, we notice that decisive identifier personal email: M is associated with source ID of 1.1.1.1. Further, the association of personal email: M to source ID 1.1.1.1 is extended from the last period when personal email: M was identified to the current period, as no other personal email is associated with source ID 1.1.1.1 during this period.

Now, referring to row 626, we notice that there has been no activity between the time stamps 1428494798.223 to 1428496871.900 for source ID 1.1.1.1. Now, referring to row 628, we notice that decisive identifier Kerberos: A is associated with source ID 1.1.1.1. Referring to cell 630, we notice that the association of decisive identifier Kerberos: A is extended till the time period during which there was no activity. In other words, the association is extended from time stamp 1428494263 to 1428494799 (which in this example, refers to a sip session for source ID 1.1.1.1).

Now, referring to row 632, we notice that a new decisive identifier Kerberos: B was associated with source ID 1.1.1.1. Referring to cell 634, we notice that decisive identifier Kerberos: B is associated with source ID 1.1.1.1 for the time period 1428496871 to 1428496872. Referring to row 636, we notice that there was no activity between the time stamps 1428496972.223 to 1428497128.571 for source ID 1.1.1.1. Now, referring back to cell 634, we notice that the association of decisive identifier Kerberos: A is extended till the time period during which there was no activity for source ID 1.1.1.1. In other words, the association is extended from time stamp 1428496872 to 1428496973 (which in this example, refers to another sip session for source ID 1.1.1.1).

Now, referring to FIG. 6A, a pictorial graph 640 shows the association of decisive identifiers to a source ID of 1.1.1.1 over a period, as previously described with reference to FIGS. 6-1 and 6.2. Line 642 shows various time stamps T1-T9 over a period of time. During time period T1-TS, decisive identifier Kerberos: A was associated with source ID 1.1.1.1. During time period T2-T4, decisive identifier Personal Email: M was associated with source ID 1.1.1.1. During time period T5-T6 and T7-T8 there was no decisive identifier associated with source ID 1.1.1.1. During time period T6-T7, decisive identifier kerberos: A was associated with source ID 1.1.1.1. During time period T8-T9, decisive identifier kerberos: B was associated with source ID 1.1.1.1.

Now, based on FIGS. 6 and 6A, an example knowledge graph is constructed.

Example knowledge graph is described with reference to FIGS. 7A and 7B. FIG. 7A shows table 700 showing various associations between a plurality of security entities, at various time stamps. FIG. 7B shows an updated knowledge graph table 730 showing various associations between a plurality of security entities, with extended time periods. Now, referring to table 700, column 702 shows time stamp, column 704 shows source ID, column 706 shows a first security entity, column 708 shows a second security entity, column 710 shows a first decisive identifier associated with at least one of the security entities and column 712 shows a second decisive identifier associated with at least one of the security entities. Various time stamps shown in table 700 correspond to the time stamp shown in FIG. 6A, which is a pictorial graph of information contained in FIG. 6. Further, association of one or more decisive identifiers as shown in table 500 of FIG. 5, further helps in developing the knowledge graph.

As an example, referring to row 714, at time stamp T1, source ID 1.1.1.1 is associated with first security entity first user computer and a second security entity first user, with a first decisive identifier Kerberos: A. For example, this corresponds to information stored in table 500 of FIG. 5. As another example, referring to row 716, at time stamp T2, source ID 1.1.1.1 is associated with first security entity first user computer and a second security entity first user, with a second decisive identifier personal email: M. Now, referring to row 718, at time stamp TS, there is no activity associated with source ID 1.1.1.1. Now, referring to row 720, at time stamp T8, source ID of 1.1.1.1 is associated with second user computer and second user (as shown in rows 516 and 518 of table 500 of FIG. 5 and further source ID of 1.1.1.1 is associated with decisive identifier kerberos: B, as described with reference to FIGS. 6 and 6A.

As previously described with reference to FIGS. 6 and 6A, the association between a security entity and a decisive identifier is extended to additional time periods, based on observed activity over the network. This extension of time period is shown and described in an updated knowledge graph table 730 shown in FIG. 7B. In one example, table 730 is similar to table 700 in construction. However, in time stamp column 702, a range of time period is shown, based on extension of time period, based on observed activity over the network. For example, based on activity observed (i.e. first decisive identifier of kerberos: A) at time stamp T1, T3 and T6, with an idle or no activity at time stamp TS, referring to row 732, the association between source ID of 1.1.1.1, first security entity and second security entity to decisive identifier kerberos: A is extended from T1-TS. Similarly, based on the observed activity at time stamp T2 and T4 (i.e. second decisive identifier of personal email: M), the association between source ID of 1.1.1.1, first security entity and second security entity to decisive identifier personal email: M is extended from T2-T4. As one skilled in the art appreciates, over time, the knowledge graph is enhanced with extended time periods showing association between a plurality of security entities and corresponding one or more decisive identifiers.

In some examples, it may be beneficial to associate each transaction to a corresponding security entity. However, not all transactions may be associated with a security entity that has been confirmed by a decisive identifier. In some examples, it may be beneficial to be able to selectively retrieve specific transactions based on one or more selective attributes and which are further associated with one or more selective security entities. In some examples, a virtual identifier may be assigned to a source ID for a subset of transactions within a predefined time period. Thereafter, when the source ID is associated with a decisive identifier, one or more of the virtual identifiers are also associated with a corresponding security entity identifier. Example implementation will now be described.

In some examples, it may be beneficial to identify a client application that is initiating a communication with a server application. In some examples, the client application communicates with a server application using one or more security protocols, for example, using protocols such as Secure Socket Layer protocol (SSL protocol) or Transport Layer Security protocol (TLS protocol). In general, security protocols enable two parties (in this case, a client application and a server application) to identify and authenticate each other and communicate with confidentiality and data integrity. For discussion purposes, this disclosure will focus on TLS protocol. However, teachings of this disclosure may be applied to other security protocols.

Figure 8A:
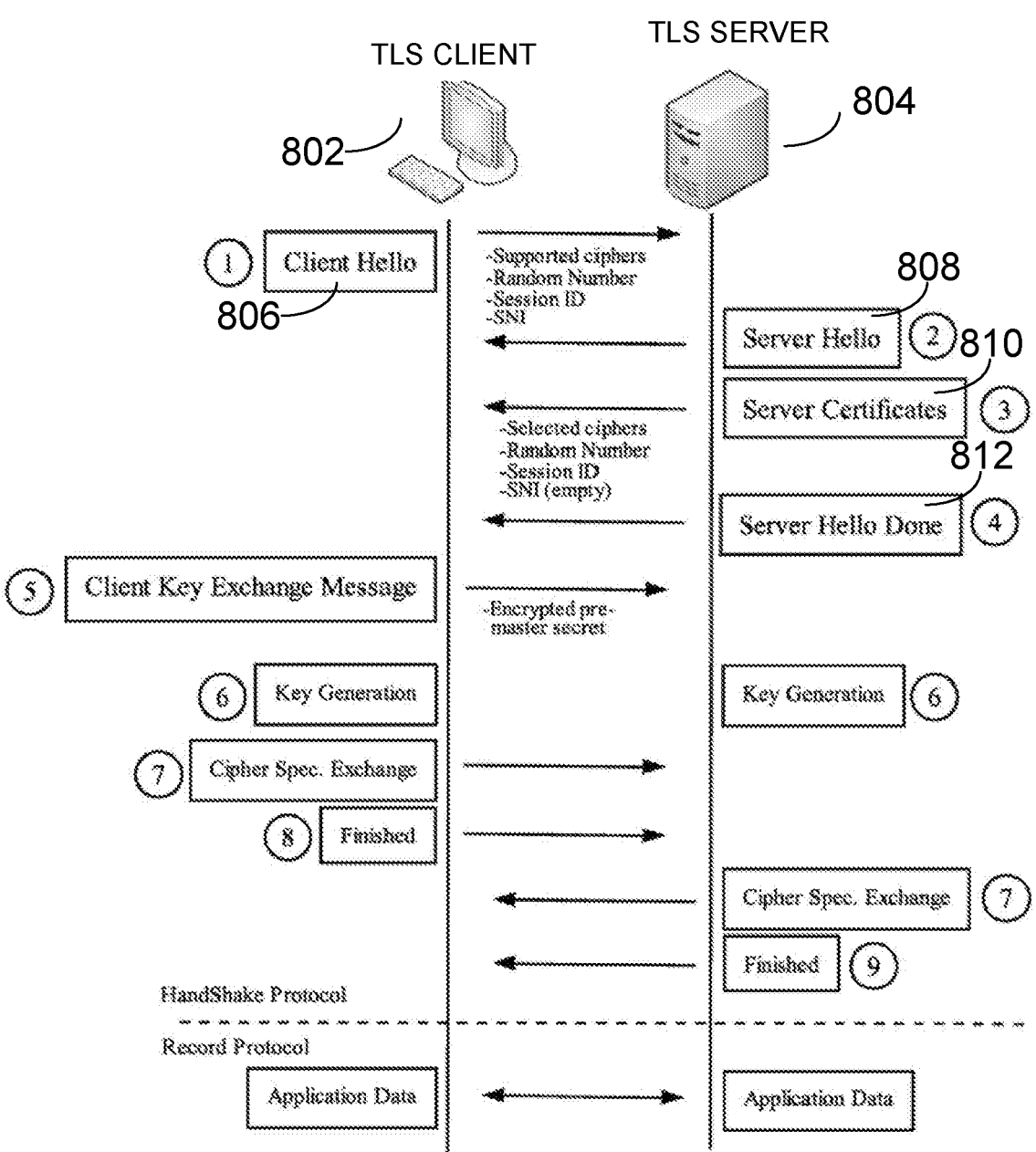
FIG. 8A shows an example handshake protocol communication between a TLS client and a TLS server.

In general, security protocols have two layers, a Handshake protocol and a Record protocol and these are layered above a transport protocol such as TCIP/IP. A TLS connection is initiated by an application, which becomes the TLS client. The application which receives the connection becomes the TLS server. Every new session begins with a handshake, as defined by the TLS protocol. Now, referring to FIG. 8A, an example communication between a TLS client 802 and a TLS server 804 is shown. Activities I through 9 correspond to the handshake protocol. Thereafter, communication under record protocol takes place. During the record protocol, application data is exchanged between the TLS client 802 and TLS server 804.

First communication initiated by the TLS client is a client hello 806. Client hello 806 includes various data fields. For example, one or more of supported ciphers, random number, Session ID and Server Name Indication (SNI) may be sent. In response to the received client hello 806, the TLS server 804 sends a Server hello 808, server certificates 810 and server hello done 812. Thereafter, a client key exchange message 814 is sent by the TLS client 802. Then, the TLS client 802 generates a key and exchanges the cipher specification with the TLS server. Thereafter, the handshake protocol is finished and the record protocol begins.

As one skilled in the art appreciates, a communication between a TLS client and TLS server begins with an un-encrypted communication (for example, during a portion of the handshake protocol) and quickly turns into an encrypted communication (for example, during the record protocol). In some examples, it may be desirable to know the client application that initiated the TLS communication with the TLS server. More specifically, it may be desirable to identify the client application that initiated the TLS communication, based on analysis of the Client hello. As one skilled in the art appreciates, the Client hello occurs during un-encrypted communication portion of the handshake protocol.

A TLS client hello may have various fields. Some are always present. Some are optionally present. Some fields are conditional extensions. Presence of a field, absence of a field, value of a field may be an indicator the TLS client application. In this disclosure, TLS client and TLS client application are interchangeably used. An example system to assign a TLS client hello to an application is described now, with reference to FIGS. 8B, 8C, 8C, 8D, 8E, 8F, 8G and 8H. The system may be implemented in the security appliance 102 as previously described, with reference to FIGS. 1 and 2. Various databases described may be implemented in one or more data stores described with reference to the security appliance 102.

Now, referring to FIG. 8B, an example SNI value database 820 is shown. The SNI value database 820 provides a cross reference between the SNI value and known application or library used by an application. For example, referring to row 822, for an SNI value of "browserdomain.net", the corresponding Application is a "Browser". Similarly, referring to row 824, for an SNI value of "justlibrary.com", the corresponding library is "SSL Library I". Functions and features of the SNI value database 820 will be described later.

Referring to FIG. 8C, an Application ID database 830 is described. the Application ID database provides a cross-reference between an identified application ID and various fields of the corresponding Client hello. In one example, the Application ID database 830 has a plurality of rows and columns, with each row referring to an identified application ID. For example, column 832 refers to the Application ID.

Column 834 refers to a primary subset of TLS fields that are used to calculate a primary fingerprint (which may be represented in multiple columns). These TLS fields are shown in FIG. 8D. Column 836 refers to a secondary subset of TLS fields, including presence or absence of certain fields (which may be represented in multiple columns). In one example, one or more of the TLS fields from the secondary subset of TLS fields may be used to generate a secondary fingerprint. These secondary subset of TLS fields is shown in FIG. 8E. Referring back to FIG. 8C, column 832 shows a label associated with the Application ID shown in column 832. Now, referring to FIGS. 8F and 8G, an example flow diagram 840 is described.

Figure 8F:
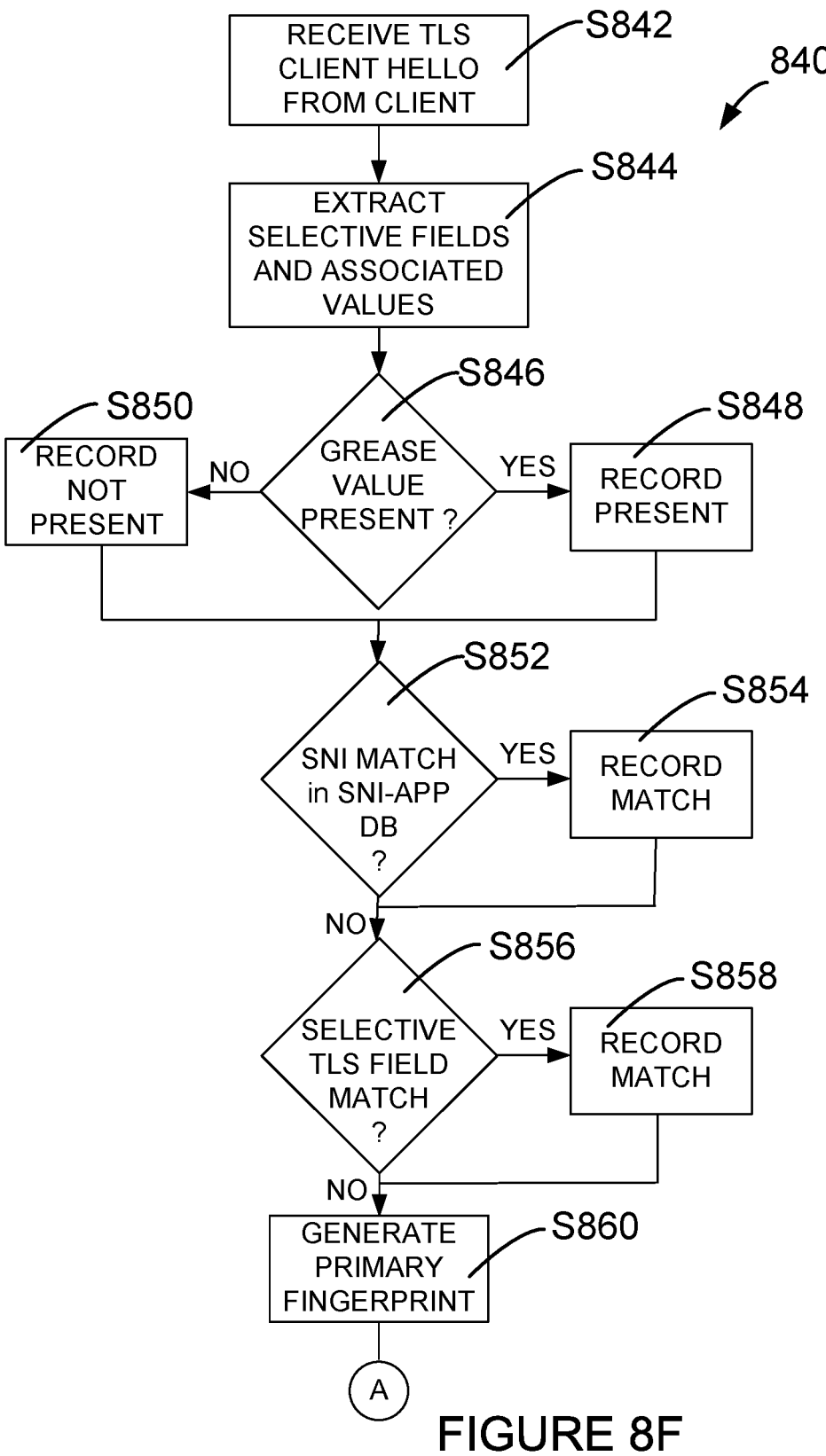
FIGS. 8F and 8G show an example flow diagram, according to an example of this disclosure.
Figure 8G:
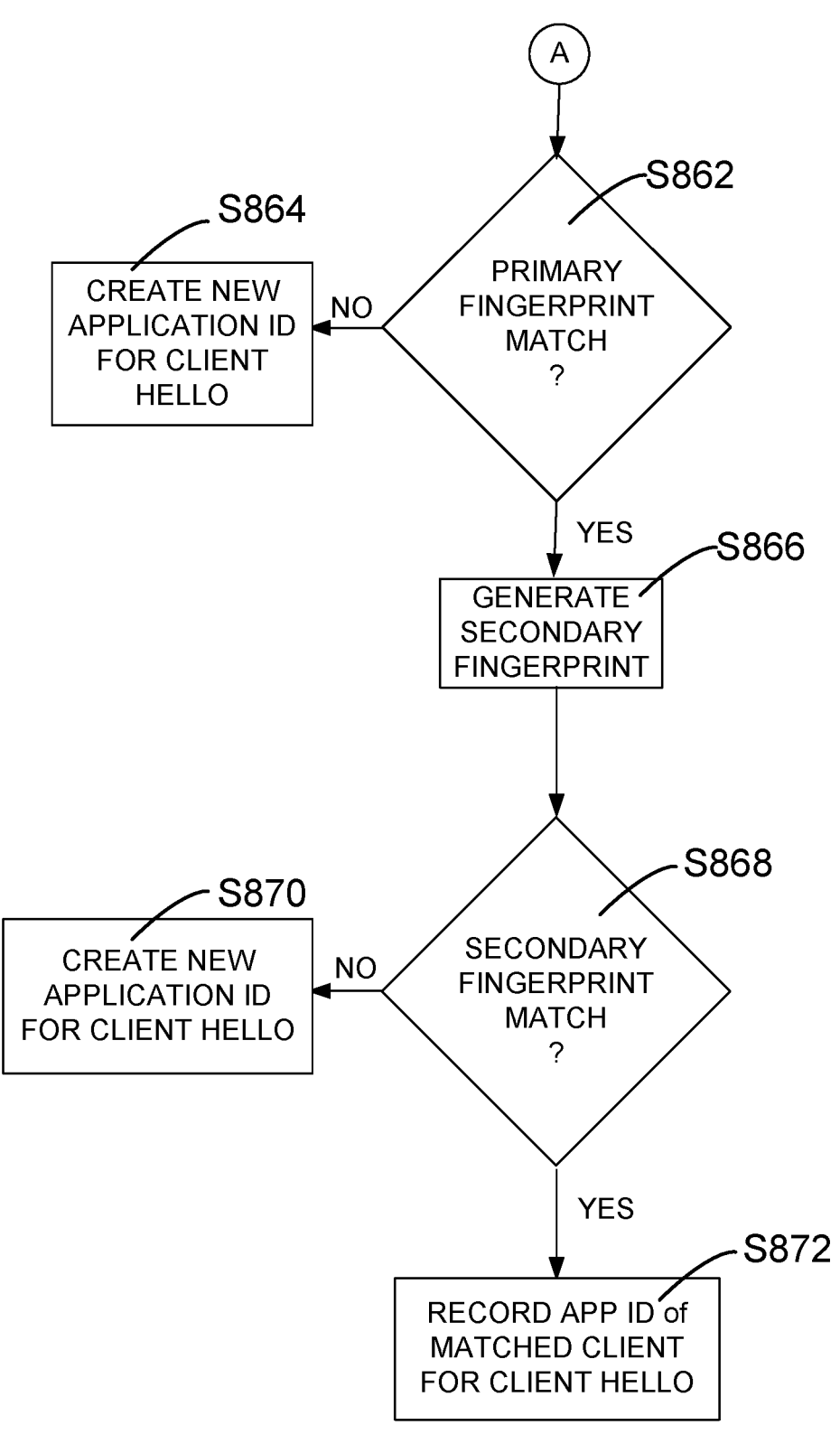

Referring to FIGS. 8F and 8G, flow diagram 840, in block S842, TLS client hello is received from the TLS client application. In block S842, selective TLS fields of the TLS client hello are extracted, along with their values. Extracted selective fields may include primary subset of fields shown in FIG. 8D and secondary subset of fields shown in FIG. 8E. These extracted TLS fields are stored in a database for further processing.

Figure 8H:
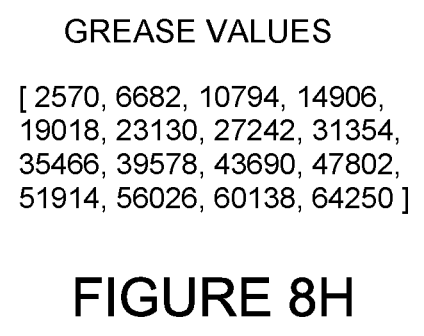

In one example, the selected field may include field referred to as GREASE value, which is a field present when compiled with BoringSSL (an example SSL cryptographic protocol). In block S846, the extracted fields are checked for the presence of GREASE values. GREASE values are shown in FIG. 8H. For example, a table with GREASE values may be stored in the security appliance 102 and extracted field is checked for the presence of GREASE value. If the GREASE value is present, in block S848 it is so indicated in the Application ID database 830. If the GREASE value is not present, in block S850 it is so indicated in the Application ID database 830.

In block S852, SNI value of the Client hello is checked against the SNI value database 820 for a match. If there is a match, in block S854, it is so recorded in the Application ID database 830.

In block 856, one or more of other TLS field values are checked to see if they indicate a specific application, application archetype or SSL library. If any match is found, in block S858 the match is recorded. For example, if the SNI value is encrypted, the TLS client is indicative of a Firefox browser. Similarly, if a GREASE value is present, it is indicative of use of the BoringSSL. BoringSSL is used by one or more of the Chrome browser, Chromium browser, Opera browser, or an application built using the Electron platform.

In block 860, a primary fingerprint is generated, using TLS field values that are part of the primary subset of TLS fields, Primary fingerprint may include one or more of the primary subset of TLS fields. Specifically, TLS fields that are conditional extensions are excluded from the calculation of the primary fingerprint. The primary fingerprint may be a signature created using a series of numbers, a hash of the TLS field values or any other sequence of numbers that may generate a unique signature. In some examples, the primary fingerprint may be a collection of TLS fields, extensions and extension values that are not conditional and are relevant in the identification of unique client applications.

In block S862, the generated primary fingerprint Is checked against stored fingerprint in the Application ID database for a match. If there is no match, in block S864, a new application ID for the client hello is created and added to the Application ID database.

As one skilled in the art appreciates, multiple applications may generate the same primary fingerprint. If there is a match for the primary fingerprint, in block S866, a secondary fingerprint is generated. The secondary fingerprint is generated using certain extension values and other TLS fields. The secondary fingerprint may be a signature created using a series of numbers, a hash of the TLS field values or any other sequence of numbers that may generate a unique signature.

In block S868, the generated secondary fingerprint is checked against stored secondary fingerprint in the Application ID database for a match. If there is no match for the secondary fingerprint, in block S870, a new application ID is added to the application ID database. If there is a match, in block S872, application ID of the matched client is assigned to the Client hello.

Now, referring to FIGS. 9A, 9B and 9C, three different examples of evaluating client hello and determining appropriate application ID will now be described.

Referring to FIG. 9A, Example 1 is shown. In this example, three Client hellos, Client hello 1-1 902, Client hello 1-2 904, and Client hello 1-3 906 are shown, along with various TLS fields and TLS field values. For example, TLS Record Version and TLS Handshake version are all of same value (771) for all three Client hello 1-1 902, Client hello 1-2 904, and Client hello 1-3 906.

Using the flow diagram 840 described with reference to FIGS. 8F and 8G, each of the client hello shown in Example 1 will be analyzed for determining and assigning an application ID to the TLS client. Referring to Client hello 1-1 902, TLS extensions, cipher suites, and supported group fields are checked for the presence of GREASE value. Referring to row 908, we notice that a GREASE value of 14906 is present in the Cipher Suites. As per the flow diagram 840, the presence of GREASE value is recorded in the Application ID database for this client hello. Next, referring to row 910, we notice SNI value of "example.com". The SNI value database 820 is queried for the presence of "example.com". In the SNI value database 820, SNI value of "example.com" is not associated with any application or library. Next, as described with reference to block S856, selective TLS field values are checked for a match in the Application ID database for an application. No match is found in this example.

Next, primary fingerprint is generated. In this example, the primary fingerprint is generated using a collection of matching cipher suites, extensions, and extension values (for example, fields shown in FIG. 8D) but excluding conditional extensions shown in FIG. 8E. For example, referring to row 912, we notice that TLS Extensions 0 and 65281 are conditional extensions. So these values are excluded from the primary fingerprint calculation. The generated primary fingerprint is compared for a match in the Application ID database. If there is no match, a new App ID is added to the Application ID database.

If there is a match for the primary fingerprint, a secondary fingerprint is generated. The Secondary fingerprint is generated using fields required for tracking successive TLS sessions where extensions and values are variable. The Application ID database is queried for a match for the generated secondary fingerprint. If there is a match, corresponding App ID is assigned to Client hello 1-1. In this example, referring to row 914, we notice the ALPN value (a conditional extension listed in FIG. 8E). In one example, the ALPN value ("h2". "SPDY/1") is used as a secondary fingerprint. The Application ID database is queried for a match for the ALPN value, for entries with matching primary fingerprint. If there is a match, corresponding App ID is assigned to the client hello. In this example, there is no match, so a new App ID 5 is assigned for this client hello.

In one example, the Application ID database is also queried for a matching primary fingerprint, without the presence of ALPN value. In this case, no match is found.

When the Client hello 1-2 and Client hello 1-3 are processed, we find that they both match to App ID 5, as their primary fingerprint values are the same and the secondary fingerprint value match to the ALPN value of "h2". "SPDY/1". FIG. 9E shows an updated Application ID database 830-1 with App ID 5 added, along with corresponding client hello.

Referring to FIG. 9B, Example 2 is shown. In this example, three Client hellos, Client hello 2-1 922, Client hello 1-2 924, and Client hello 1-3 926 are shown, along with various TLS fields and TLS field values. For example, TLS Record Version and TLS Handshake version are all of same value (771) for all three Client hello 2-1 922, Client hello 2-2 924, and Client hello 2-3 926.

Using the flow diagram 840 described with reference to FIGS. 8F and 8G, each of the client hello shown in Example 2 will be analyzed for determining and assigning an application ID to the TLS client. Referring to Client hello 2-1 922, TLS extensions, cipher suites, and supported group fields are checked for the presence of GREASE value. Referring to row 928, we notice that a GREASE value of 14906 is present in the Cipher Suites. As per the flow diagram 840, the presence of GREASE value is recorded in the Application ID database for this client hello. Next, referring to row 930, we notice SNI value of "specificbrowser.com". The SNI value database 820 is queried for the presence of "specificbrowser.com". In the SNI value database 820, SNI value of "specificbrowser.com" is associated with "Some Specific Browser". The label "Some Specific Browser" will be recorded for this Client hello. Next, as described with reference to block S856, selective TLS field values are checked for a match in the Application ID database for an application. No match is found in this example. So no other label is added for this Client hello.

Next, primary fingerprint is generated. In this example, the primary fingerprint is generated using a collection of matching cipher suites, extensions, and extension values (for example, fields shown in FIG. 8D) but excluding conditional extensions shown in FIG. 8E. For example, referring to row 932, we notice that TLS Extensions 0 and 65281 are conditional extensions. So these values are excluded from the primary fingerprint calculation. The generated primary fingerprint is compared for a match in the Application ID database. If there is no match, a new App ID is added to the Application ID database.

If there is a match for the primary fingerprint, a secondary fingerprint is generated. The Secondary fingerprint is generated using fields required for tracking successive TLS sessions where extensions and values are variable. The Application ID database is queried for a match for the generated secondary fingerprint. If there is a match, corresponding App ID is assigned to Client hello 2-1. In this example, referring to row 934, we notice the ALPN value (a conditional extension listed in FIG. 8E). In one example, the ALPN value ("h2", "SPDY/1") is used as a secondary fingerprint. The Application ID database is queried for a match for the ALPN value, for entries with matching primary fingerprint. If there is a match, corresponding App ID is assigned to the client hello. In this example, there is a match for App ID 2, so App ID 2 is assigned for this client hello. In one example, the Application ID database is also queried for a matching primary fingerprint, without the presence of ALPN value. In this case, no match is found.

When the Client hello 2-2 and Client hello 2-3 are processed, we find that they both match to App ID 2, as their primary fingerprint values are the same. However, these two Client hello do not have an ALPN value, but do match to an SNI database entry, App ID 2 is assigned to Client hello 2-2 and 2-3. For example, FIG. 9E shows assignment of Client hello 2-1, 2-2 and 2-3 to App ID 2.

Referring to FIG. 9C, Example 3 is shown. In this example, three Client hellos, Client hello 3-1 942, Client hello 3-2 944, and Client hello 3-3 946 are shown, along with various TLS fields and TLS field values. For example, TLS Record Version and TLS Handshake version are all of same value (771) for all three Client hello 3-1 922, Client hello 3-2 924, and Client hello 3-3 926.

Using the flow diagram 840 described with reference to FIGS. 8F and 8G, each of the client hello shown in Example 3 will be analyzed for determining and assigning an application ID to the TLS client. Referring to Client hello 3-1 942, TLS extensions, cipher suites, and supported group fields are checked for the presence of GREASE value. Referring to row 948, we notice that no GREASE value is present in the Cipher Suites. As per the flow diagram 840, the absence of GREASE value is recorded in the Application ID database for this client hello. Next, referring to row 950, we notice SNI value of "foobar.com". The SNI value database 820 is queried for the presence of "foobar.com". In the SNI value database 820, SNI value of "foobar.com" is not associated with any label. So, no label is recorded for this client hello.

Next, as described with reference to block S856, selective TLS field values are checked for a match in the Application ID database for an application. Referring to row 952, we find that TLS extension 7000 is present and it is known that TLS Extension of 7000 is only used by application "Computer Cleaner Plus". So label "Computer Cleaner Plus" is associated with this Client hello.

Next, primary fingerprint is generated. In this example, the primary fingerprint is generated using a collection of matching cipher suites, extensions, and extension values (for example, fields shown in FIG. 8D) but excluding conditional extensions shown in FIG. 8E. For example, referring to row 952, we notice that TLS Extensions 0 and 65281 are conditional extensions. So these values are excluded from the primary fingerprint calculation. The generated primary fingerprint is compared for a match in the Application ID database. If there is no match, a new App ID is added to the Application ID database. In this example, there is no match and a new App ID 6 is assigned to this Client hello and a label "Computer Cleaner Plus" is added.

When the Client hello 3-2 and Client hello 3-3 are processed, we find that they both match to App ID 6, as their primary fingerprint values are the same. For example, FIG. 9E shows assignment of Client hello 2-1, 2-2 and 2-3 to App ID 6.

Referring to FIG. 9C, Example 3 is shown. In this example, three Client hellos, Client hello 3-1 942, Client hello 3-2 944, and Client hello 3-3 946 are shown, along with various TLS fields and TLS field values. For example, TLS Record Version and TLS Handshake version are all of same value (771) for all three Client hello 3-1 942, Client hello 3-2 944, and Client hello 3-3 946.

Using the flow diagram 840 described with reference to FIGS. 8F and 8G, each of the client hello shown in Example 3 will be analyzed for determining and assigning an application ID to the TLS client. Referring to Client hello 3-1 942, TLS extensions, cipher suites, and supported group fields are checked for the presence of GREASE value.

Referring to row 948, we notice that no GREASE value is present in the Cipher Suites. As per the flow diagram 840, the absence of GREASE value is recorded in the Application ID database for this client hello. Next, referring to row 950, we notice SNI value of "foobar.com". The SNI value database 820 is queried for the presence of "foobar.com". In the SNI value database 820, SNI value of "foobar.com" is not associated with any label. So, no label is recorded for this client hello.

Next, as described with reference to block S856, selective TLS field values are checked for a match in the Application ID database for an application. Referring to row 952, we find that TLS extension 7000 is present and it is known that TLS Extension of 7000 is only used by application "Computer Cleaner Plus". So label "Computer Cleaner Plus" is associated with this Client hello.

Next, primary fingerprint is generated. In this example, the primary fingerprint is generated using a collection of matching cipher suites, extensions, and extension values (for example, fields shown in FIG. 8D) but excluding conditional extensions shown in FIG. 8E. For example, referring to row 952, we notice that TLS Extensions 0 and 65281 are conditional extensions. So these values are excluded from the primary fingerprint calculation. The generated primary fingerprint is compared for a match in the Application ID database. If there is no match, a new App ID is added to the Application ID database. In this example, there is no match and a new App ID 6 is assigned to this Client hello and a label "Computer Cleaner Plus" is added.

When the Client hello 3-2 and Client hello 3-3 are processed, we find that they both match to App ID 6, as their primary fingerprint values are the same. For example, FIG. 9E shows assignment of Client hello 3-1, 3-2 and 3-3 to App ID 6.

Referring to FIG. 9D, Example 4 is shown. In this example, three Client hellos, Client hello 4-1 962, Client hello 4-2 964, and Client hello 4-3 966 are shown, along with various TLS fields and TLS field values. For example, TLS Record Version and TLS Handshake version are all of same value (771) for all three Client hello 4-1 962, Client hello 4-2 964, and Client hello 3-3 966.

Using the flow diagram 840 described with reference to FIGS. 8F and 8G, each of the client hello shown in Example 4 will be analyzed for determining and assigning an application ID to the TLS client. Referring to Client hello 4-1 962, TLS extensions, cipher suites, and supported group fields are checked for the presence of GREASE value. Referring to row 968, we notice that no GREASE value is present in the Cipher Suites. As per the flow diagram 840, the absence of GREASE value is recorded in the Application ID database for this client hello. Next, referring to row 970, we notice SNI value of "toobar.com". The SNI value database 820 is queried for the presence of "toobar.com". In the SNI value database 820, SNI value of "toobar.com" is not associated with any label. So, no label is recorded for this client hello.

Next, as described with reference to block S856, selective TLS field values are checked for a match in the Application ID database for an application. In this example, no match is found. So no label is associated with this Client hello.

Next, primary fingerprint is generated. In this example, the primary fingerprint is generated using a collection of matching cipher suites, extensions, and extension values (for example, fields shown in FIG. 8D) but excluding conditional extensions shown in FIG. 8E. For example, referring to row 972, we notice that TLS Extensions 0 is a conditional extension. So this value is excluded from the primary fingerprint calculation. The generated primary fingerprint is compared for a match in the Application ID database. If there is no match, a new App ID is added to the Application ID database. In this example, there is no match and a new App ID 7 is assigned to this Client hello.

When the Client hello 4-2 is processed, we find that primary fingerprint matches to the App ID 7. However, Client hello 4-3 does not match to the primary fingerprint of App ID 7. So, a new App ID 8 is assigned to Client hello 4-3. For example, FIG. 9E shows assignment of Client hello 4-1 and 4-2 to App ID 7 and Client hello 4-3 is assigned to App ID 8.

As one skilled in the art appreciates, security entities may be data, network, organization, device, persona (or user attributes) and application. In one example, the security entities are entities that may have attributes that may be directly or indirectly relevant from a security or threat analysis perspective. The security appliance 102 selectively extracts information from communication between two computing devices and builds one or more tables and matrices of useful information, for example, various tables and matrix described in this disclosure.

Figure 10:
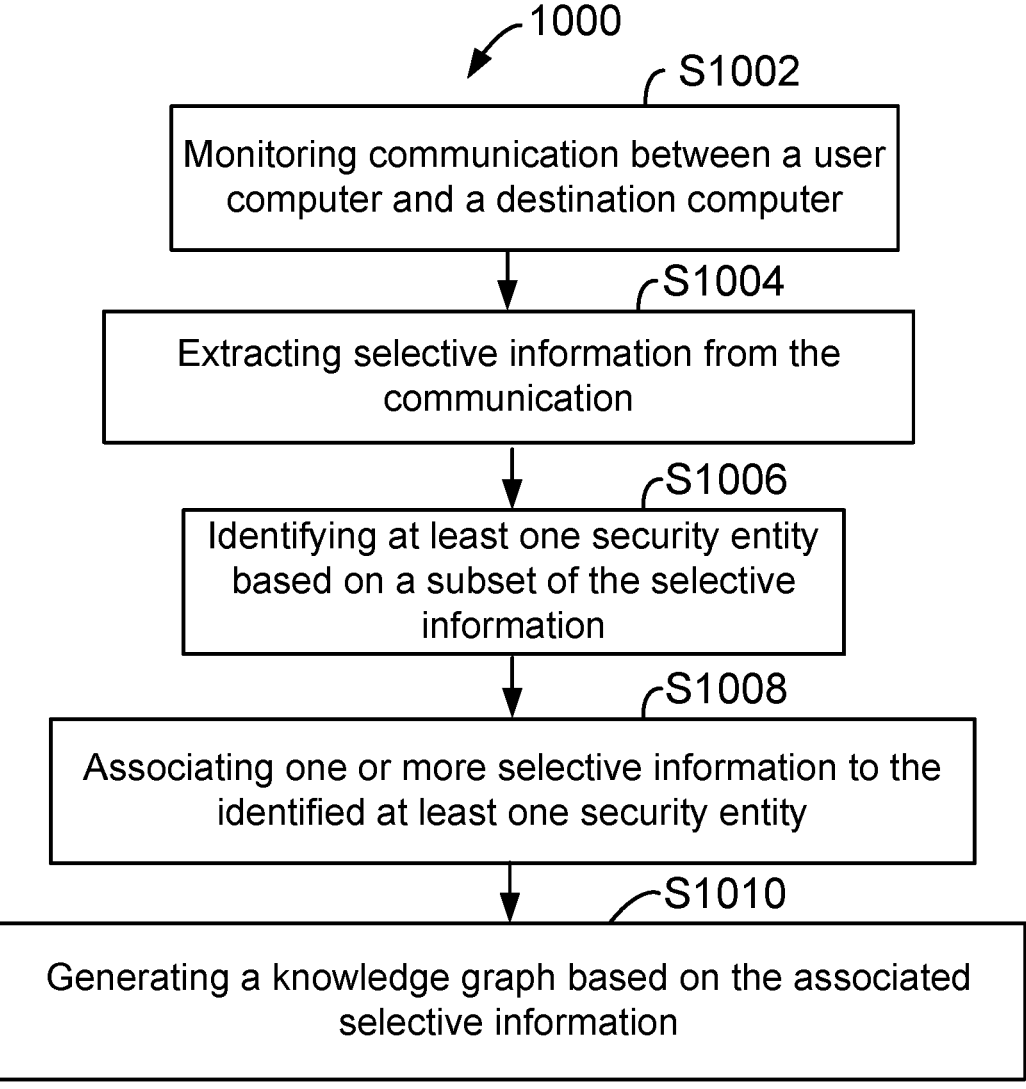
FIG. 10 shows an example flow diagram to identify security entities m a computing environment, according to an example implementation of this disclosure.

Now, referring to FIG. 10 an example flow diagram 1000 is described. In block S1002, communication between a user computer and a destination computer is monitored. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1.

In block S1004, selective information from the communication is extracted. For example, as described with reference to security appliance 102 of FIG. 2 selective information from the packets are extracted.

In block S1006, at least one security entity is identified based on a subset of the selective information. For example, as described with reference to FIG. 5, one or more security entities may be identified based on a subset of selective information. In some examples, the analytics engine 212 of the security appliance 102 may be configured to identify one or more security entities based on a subset of the selective information.

In block S1008, one or more selective information may be associated to at least one security entity. For example, as described with reference to FIGS. 6A, 6B and 6C, one or more selective information may be associated to at least one security entity. In some examples, the analytics engine 212 of the security appliance 102 may be configured to associate one or more selective information to at least one security entity.

In block S1010, a knowledge graph Is generated based on the associated selective information. For example, as described with reference to FIGS. 7A and 7B, a knowledge graph may be generated based on the associated selective information.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method performed by a device, the method comprising:

receiving a communication sent by an application, the communication including a first set of fields and a second set of fields;

generating a primary fingerprint based on the first set of fields;

checking the primary fingerprint against one or more stored primary fingerprints;

upon determining that the primary fingerprint matches a stored primary fingerprint, generating a secondary fingerprint based on the second set of fields;

checking the secondary fingerprint against one or more stored secondary fingerprints; and upon determining that the secondary fingerprint matches a stored secondary fingerprint, assigning to the communication an application identifier (ID) that is associated with the stored primary fingerprint and the stored secondary fingerprint, the application ID identifying the application that sent the communication.

2. The method of claim 1 wherein the communication is a hello packet that is communicated as part of a handshake protocol of a secure communication protocol.

3. The method of claim 2 wherein the first and second sets of fields pertain to the secure communication protocol.

4. The method of claim 2 wherein the secure communication protocol is Transport Layer Security (TLS) and wherein the first set of fields excludes TLS conditional extension fields.

5. The method of claim 2 wherein the secure communication protocol is TLS and wherein the second set of fields includes one or more TLS conditional extension fields.

6. The method of claim 1 wherein the device is a security appliance that receives the communication from a network tap device.

7. The method of claim 1 further comprising, prior to generating the primary fingerprint:

extracting a third set of fields from the communication, the third set of fields being selected from the first set of fields and/or the second set of fields; and evaluating the third set of fields to determine a type and/or a label associated with the application.

8. The method of claim 7 further comprising, upon determining that the primary fingerprint does not match any stored primary fingerprint or that the secondary fingerprint does not match any stored secondary fingerprint:

generating a new application ID for the communication;

associating the type and/or the label with the new application ID; and assigning the new application ID with the associated type and/or label to the communication.

9. The method of claim 7 wherein evaluating the third set of fields comprises:

determining whether a grease value is present in any of the third set of fields.

10. The method of claim 7 wherein evaluating the third set of fields comprises:

determining whether a Server Name Indication (SNI) value included in any of the third set of fields matches an entry in an SNI database.

11. An apparatus comprising:

one or more processors; and a memory or storage having stored thereon instructions that, when executed by the one or more processors, cause the one or more processors to:

receive a communication sent by an application, the communication including a first set of fields and a second set of fields;

generate a primary fingerprint based on the first set of fields;

check the primary fingerprint against one or more stored primary fingerprints;

upon determining that the primary fingerprint matches a stored primary fingerprint, generate a secondary fingerprint based on the second set of fields;

check the secondary fingerprint against one or more stored secondary fingerprints; and upon determining that the secondary fingerprint matches a stored secondary fingerprint, assign to the communication an application identifier (ID) that is associated with the stored primary fingerprint and the stored secondary fingerprint, the application ID identifying the application that sent the communication.

12. The apparatus of claim 11 wherein the communication is a hello packet that is communicated as part of a handshake protocol of a secure communication protocol.

13. The apparatus of claim 12 wherein the secure communication protocol is Transport Layer Security (TLS) and wherein the first set of fields excludes TLS conditional extension fields.

14. The apparatus of claim 13 wherein the secure communication protocol is TLS and wherein the second set of fields includes one or more TLS conditional extension fields.

15. The apparatus of claim 11 wherein the apparatus is a security appliance that receives the communication from a network tap device.

16. The apparatus of claim 11 wherein the instructions further cause the one or more processors to, prior to generating the primary fingerprint:

extract a third set of fields from the communication, the third set of fields being selected from the first set of fields and/or the second set of fields; and evaluate the third set of fields to determine a type and/or a label associated with the application.

17. The apparatus of claim 16 wherein the instructions further cause the one or more processors to, upon determining that the primary fingerprint does not match any stored primary fingerprint or that the secondary fingerprint does not match any stored secondary fingerprint:

generate a new application ID for the communication;

associate the type and/or the label with the new application ID; and assign the new application ID with the associated type and/or label to the communication.

18. The apparatus of claim 16 wherein evaluating the third set of fields comprises:

determining whether a grease value is present in any of the third set of fields.

19. The apparatus of claim 16 wherein evaluating the third set of fields comprises:

determining whether a Server Name Indication (SNI) value included in any of the third set of fields matches an entry in an SNI database.

20. A non-transitory computer-readable storage medium having stored thereon program code executable by one or more processors, the program code causing the one or more processors to:

receive a communication sent by an application, the communication including a first set of fields and a second set of fields;

generate a primary fingerprint based on the first set of fields;

check the primary fingerprint against one or more stored primary fingerprints;

upon determining that the primary fingerprint matches a stored primary fingerprint, generate a secondary fingerprint based on the second set of fields;

check the secondary fingerprint against one or more stored secondary fingerprints; and upon determining that the secondary fingerprint matches a stored secondary fingerprint, assign to the communication an application identifier (ID) that is associated with the stored primary fingerprint and the stored secondary fingerprint, the application ID identifying the application that sent the communication.

* * * * *